(12) United States Patent
McCorkle

(10) Patent No.: US 7,697,630 B2
(45) Date of Patent: *Apr. 13, 2010

(54) ULTRA WIDEBAND COMMUNICATION METHOD WITH LOW NOISE PULSE FORMATION

(75) Inventor: John W. McCorkle, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/155,948

(22) Filed: Jun. 12, 2008

(65) Prior Publication Data

US 2008/0247486 A1    Oct. 9, 2008

Related U.S. Application Data

(63) Continuation of application No. 10/705,120, filed on Nov. 12, 2003, now Pat. No. 7,394,866, which is a continuation of application No. 09/684,400, filed on Oct. 10, 2000, now Pat. No. 6,735,238.

(51) Int. Cl.
    *H04L 27/04*    (2006.01)
(52) U.S. Cl. ........................ 375/295; 375/130
(58) Field of Classification Search ................ 375/295, 375/286, 130, 146; 398/183; 329/313
    See application file for complete search history.

(56) References Cited

U.S. PATENT DOCUMENTS

| | | | |
|---|---|---|---|
| 3,921,171 A | 11/1975 | Strother et al. | |
| 4,145,568 A | 3/1979 | Ehrat | |
| 5,519,400 A | 5/1996 | McEwan | |
| 5,583,892 A | 12/1996 | Drakul et al. | |
| 5,677,927 A | 10/1997 | Fullerton et al. | |
| 6,026,125 A | 2/2000 | Larrick, Jr. et al. | |
| 6,351,246 B1 | 2/2002 | McCorkle | |
| 6,505,032 B1 | 1/2003 | McCorkle | |
| 6,700,939 B1 | 3/2004 | McCorkle et al. | |
| 6,735,238 B1 | 5/2004 | McCorkle | |
| 7,010,056 B1 | 3/2006 | McCorkle et al. | |
| 7,394,866 B2 * | 7/2008 | McCorkle | 375/295 |

OTHER PUBLICATIONS

U.S. Appl. No. 60/207,255, filed May 26, 2000, McCorkle.
U.S. Appl. No. 60/217,099, filed Jul. 10, 2000, Miller.
U.S. Appl. No. 09/633,815, filed Aug. 7, 2000, McCorkle.
U.S. Appl. No. 60/238,466, filed Oct. 10, 2000, McCorkle.
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.
U.S. Appl. No. 09/685,196, filed Oct. 10, 2000, Miller.

(Continued)

*Primary Examiner*—Temesghen Ghebretinsae

(57) ABSTRACT

An ultra-wide band (UWB) waveform encoding method is provided. The method includes receiving a data stream; generating a first encoder signal and a second encoder signal such that if the first and second encoder signals were mixed, the mixing would return a representation of the data stream; generating a sequence of pulses; mixing the first encoder signal with at least a portion of the sequence of pulses, to produce a mixing result; and mixing the second encoder signal with the mixing result, to produce a sequence of ultra wideband wavelets encoded in accordance with the data stream.

9 Claims, 17 Drawing Sheets

OTHER PUBLICATIONS

U.S. Appl. No. 09/685,197, filed Oct. 10, 2000, Miller.
U.S. Appl. No. 09/685,198, filed Oct. 10, 2000, McCorkle.
U.S. Appl. No. 09/685,199, filed Oct. 10, 2000, McCorkle.
U.S. Appl. No. 09/685,200, filed Oct. 10, 2000, McCorkle.
Comerford, Richard, "Handhelds Duke It Out for the Internet", IEEE Spectrum, pp. 35-41, Aug. 2000.
U.S. Appl. No. 09/685,202, filed Oct. 10, 2000, Rofheart.
U.S. Appl. No. 09/685,203, filed Oct. 10, 2000, Miller.
U.S. Appl. No. 09/685,205, filed Oct. 10, 2000, McCorkle.

* cited by examiner

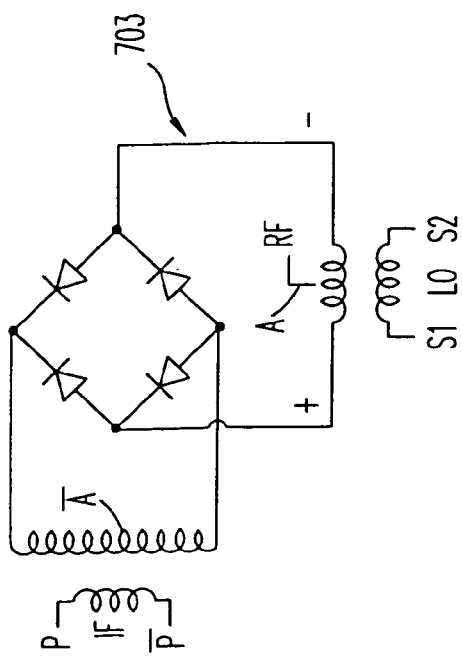
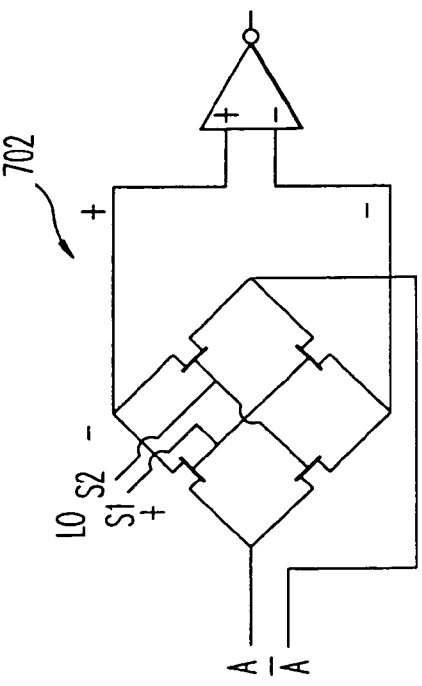
FIG. 9F
FIG. 9E
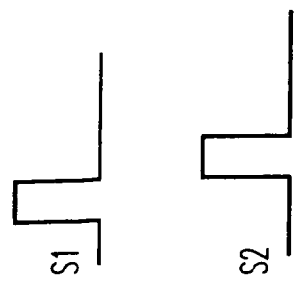
FIG. 9B
FIG. 9C
FIG. 9D
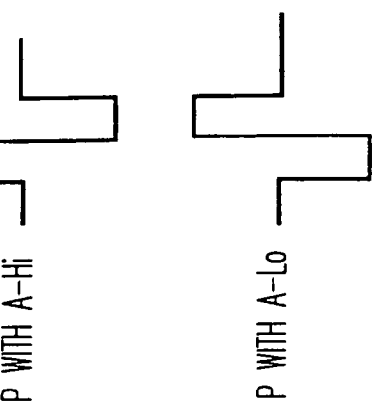

ULTRA WIDEBAND COMMUNICATION METHOD WITH LOW NOISE PULSE FORMATION

CROSS REFERENCE TO RELATED PATENT DOCUMENTS

The present application is a continuation application of application Ser. No. 10/705,120, filed Nov. 12, 2003, entitled ULTRA WIDEBAND COMMUNICATION SYSTEM, METHOD, AND DEVICE WITH LOW NOISE PULSE FORMATION, which was a continuation application of application Ser. No. 09/684,400, filed Oct. 10, 2000, entitled ULTRA WIDEBAND COMMUNICATION SYSTEM, METHOD, AND DEVICE WITH LOW NOISE PULSE FORMATION, now issued as U.S. Pat. No. 6,735,238, the contents of which are incorporated by reference in their entirety.

The present document contains subject matter related to that disclosed in commonly owned, co-pending application Ser. No. 09/209,460 filed Dec. 11, 1998, entitled ULTRA WIDE BANDWIDTH SPREAD-SPECTRUM COMMUNICATIONS SYSTEM, now issued as U.S. Pat. No. 6,700,939; Ser. No. 09/633,815 filed Aug. 7, 2000, entitled ELECTRICALLY SMALL PLANAR UWB ANTENNA; application Ser. No. 09/563,292 filed May 3, 2000, entitled PLANAR ULTRA WIDE BAND ANTENNA WITH INTEGRATED ELECTRONICS, now issued as U.S. Pat. No. 6,351,246; Application Ser. No. 60/207,225 filed May 26, 2000, entitled ULTRAWIDEBAND COMMUNICATION SYSTEM AND METHOD; application Ser. No. 09/685,198 filed Oct. 10, 2000, entitled ANALOG SIGNAL SEPARATOR FOR UWB VERSUS NARROWBAND SIGNALS, now issued as U.S. Pat. No. 7,006,553; Application Ser. No. 60/238,466 filed Oct. 10, 2000, entitled ULTRA WIDE BANDWIDTH NOISE CANCELLATION MECHANISM AND METHOD; Application Ser. No. 60/217,099 filed Jul. 10, 2000, entitled MULTIMEDIA WIRELESS PERSONAL AREA NETWORK (WPAN) PHYSICAL LAYER SYSTEM AND METHOD; application Ser. No. 09/685,203 filed Oct. 10, 2000, entitled SYSTEM AND METHOD FOR BASEBAND REMOVAL OF NARROWBAND INTERFERENCE IN ULTRA WIDEBAND SIGNALS, now issued as U.S. Pat. No. 6,834,073; application Ser. No. 09/685,197 filed Oct. 10, 2000, entitled MODE CONTROLLER FOR SIGNAL ACQUISITION AND TRACKING IN AN ULTRA WIDE-BAND COMMUNICATION SYSTEM, now issued as U.S. Pat. No. 6,965,630; application Ser. No. 09/685,195 filed Oct. 10, 2000, entitled ULTRA WIDE BANDWIDTH SYSTEM AND METHOD FOR FAST SYNCHRONIZATION, now issued as U.S. Pat. No. 6,925,108; application Ser. No. 09/684,401 filed Oct. 10, 2000, entitled ULTRA WIDE BANDWIDTH SYSTEM AND METHOD FOR FAST SYNCHRONIZATION USING SUB CODE SPINS, now issued as U.S. Pat. No. 6,967,993; application Ser. No. 09/685,196 filed Oct. 10, 2000, entitled ULTRA WIDE BANDWIDTH SYSTEM AND METHOD FOR FAST SYNCHRONIZATION USING MULTIPLE DETECTION ARMS, now issued as U.S. Pat. No. 7,079,604; application Ser. No. 09/685,199 filed Oct. 10, 2000, entitled A LOW POWER, HIGH RESOLUTION TIMING GENERATOR FOR ULTRA-WIDE BANDWIDTH COMMUNICATION SYSTEMS, now issued as U.S. Pat. No. 6,975,665; application Ser. No. 09/685,202 filed Oct. 10, 2000, entitled METHOD AND SYSTEM FOR ENABLING DEVICE FUNCTIONS BASED ON DISTANCE INFORMATION, now issued as U.S. Pat. No. 7,058,414; application Ser. No. 09/685,201 filed Oct. 10, 2000, entitled CARRIERLESS ULTRA WIDEBAND WIRELESS SIGNALS FOR CONVEYING APPLICATION DATA, now issued as U.S. Pat. No. 6,505,032; application Ser. No. 09/685,205 filed Oct. 10, 2000, entitled SYSTEM AND METHOD FOR GENERATING ULTRA WIDEBAND PULSES, now issued as U.S. Pat. No. 7,010,056; application Ser. No. 09/684,782 filed Oct. 10, 2000, entitled ULTRA WIDEBAND COMMUNICATION SYSTEM, METHOD, AND DEVICE WITH LOW NOISE RECEPTION, now issued as U.S. Pat. No. 6,859,506; and application Ser. No. 09/685,200 filed Oct. 10, 2000, entitled LEAKAGE NULLING RECEIVER CORRELATOR STRUCTURE AND METHOD FOR ULTRA WIDE BANDWIDTH COMMUNICATION SYSTEM, now issued as U.S. Pat. No. 6,937,646, the entire contents of each of which being incorporated herein by reference.

BACKGROUND OF THE INVENTION

1. Field of the Invention

The present invention relates to ultra wideband (UWB) radio communication systems, methods and devices used in the system for generating UWB waveforms that include wavelets that are modulated to convey digital data over a wireless radio communication channel using ultra wideband signaling techniques.

2. Description of the Background

There are numerous radio communication techniques to transmit digital data over a wireless channel. These techniques include those used in mobile telephone systems, pagers, remote data collection systems, and wireless networks for computers, among others. Most conventional wireless communication techniques modulate the digital data onto a high-frequency carrier that is then transmitted via an antenna into space.

Ultra wideband (UWB) communications systems transmit carrierless high data rate, low power signals. Since a carrier is not used, the transmitted waveforms themselves contain the information being communicated. Accordingly, conventional UWB systems transmit pulses, the information to be communicated is contained in the pulses themselves, and not on a carrier.

Conventional UWB communication systems send a sequence of identical pulses, the timing of which carries the information being communicated, for example, as described by Fullerton and Cowie (U.S. Pat. No. 5,677,927). This technique is known as pulse position modulation (PPM). In a PPM scheme, the information in a pulse is obtained by determining an arrival time of the pulse at a receiver relative to other pulses. For example, given an exemplary time window, if a pulse is received at the beginning of that time window, the receiver will decode that pulse as a '1,' whereas if the pulse is received at the end of that same time window, the receiver will decode that pulse as a '0.'

Several problems arise with this technique, however, as recognized by the present inventors. First, it is not as efficient as other techniques, for example, sending non-inverted and inverted pulses where 3 dB less radiated power is required to communicate in the same memory-less Gaussian white noise channel. Second, reflections from objects in the vicinity of the transmitter and receiver can cause a pulse that was supposed to be at the beginning of the time window, to appear in at the end of time window, or even in the time window of a subsequent pulse.

As a result, it would be advantageous if the data stream to be transmitted could be encoded by changing a shape of the UWB pulse rather than a position of the UWB pulse as with conventional systems. For example, if the UWB pulses had two possible shapes, a single time frame could be used encode a single bit of data, rather than the two time frames (i.e., early and late) that would be required by a PPM system. In the present UWB communications system, and related co-pending application Ser. No. 09/209,460 filed May 14, 1998, entitled ULTRA WIDE BANDWIDTH SPREAD SPECTRUM COMMUNICATIONS SYSTEM, now issued as U.S. Pat. No. 6,700,939, information is carried by the shape of the pulse, or the shape in combination with its position in the pulse-sequence.

Conventional techniques for generating pulses include a variety of techniques, for example, networks of transmission lines such as those described in co-pending application Ser. No. 09/209,460 filed May 14, 1998, entitled ULTRA WIDE BANDWIDTH SPREAD SPECTRUM COMMUNICATIONS SYSTEM, now issued as U.S. Pat. No. 6,700,939. One of the problems associated with this technique is that the transmission lines take up sizeable space and accordingly, are not amenable to integration on a monolithic integrated circuit. Given that a key targeted use of UWB systems is for small, handheld mobile devices such as personal digital assistants (PDAs) and mobile telephones, space is at a premium when designing UWB systems. Furthermore, it is highly desirable to integrate the entire radio onto a single monolithic integrated circuit in order to meet the cost, performance, and volume-production requirements of consumer electronics devices.

A key attribute that must be maintained, however, regardless of how the information is carried, is that no tones can be present. In other words, the average power spectrum must be smooth and void of any spikes. In generating these UWB pulse streams, however, non-ideal device performance can cause tones to pass through to the antenna and to be radiated. In particular, switches, gates, and analog mixers that are used to generate pulses are well known to be non-ideal devices. For example, leakage is a problem. A signal that is supposed to be blocked at certain times, for example, can continue to leak through. Similarly, non-ideal symmetry in positive and negative voltages or current directions can allow tones be generated or leak through. In another example, the output of a mixer can include not only the desired UWB pulse stream, but also spikes in the frequency domain at the clock frequency and its harmonics, as well as other noise, due to leakage between the RF, LO, and IF ports. This is problematic since one of the design objectives is to generate a pulse stream that will not interfere with other communications systems.

Similar problems to those discussed above regarding transmitters are also encountered in UWB receivers. Mixers are used in UWB receivers to mix the received signal with known waveforms so that the transmitted data may be decoded. As discussed above, the spectral spikes (DC and otherwise) introduced by the non-ideal analog mixers can make decoding of only moderately weak signals difficult or impossible.

Furthermore, UWB receivers often suffer from leakage of the UWB signal driving the mixer due to the large amplitude of the drive signal and its very close proximity to the antenna as well as adjacent components. These UWB drive signals can radiate into space and be received by the antenna where it can jam the desired UWB signal, or be coupled via the substrate. This reception of the drive signal being used to decode the received signal can therefore cause a self-jamming condition wherein the desired signal becomes unintelligible.

The challenge, then, as presently recognized, is to develop a highly integratable approach for generating shape-modulated wavelet sequences that can be used in a UWB communications system to encode, broadcast, receive, and decode a data stream. It would be advantageous if the data stream to be transmitted could be encoded by changing a shape of the UWB pulse rather than a position of the UWB pulse as with conventional systems.

Furthermore, the challenge is to build such a wavelet generator where the smooth power spectrum calculated by using ideal components, is realized using non-ideal components. In other words, an approach to generating and receiving UWB waveforms that does not generate unwanted frequency domain spikes as a by-product, spikes that are prone to interfere with other communications devices or cause self-jamming, would be advantageous.

It would also be advantageous if the UWB waveform generation approach were to minimize the power consumption because many of the targeted applications for UWB communications are in handheld battery-operated mobile devices.

SUMMARY OF THE INVENTION

Accordingly, one object of this invention is to provide a novel programmable wavelet generator for generating a variety of wavelets for use in a UWB communication system that addresses the above-identified and other problems with conventional devices.

The inventors of the present invention have recognized that by implementing a two-mixer approach to generating UWB waveforms, that the noise leakage from the non-ideal analog mixers can be whitened, thereby avoiding the interference problems caused by conventional single-mixer approaches. The present inventors have provided a contrarian approach of suppressing mixer-created interference by using a second mixer.

The inventors of the present invention have also recognized that by creating a UWB waveform by mixing two derivative data streams running at one-half a chipping rate of the original data stream, that power consumption can be reduced within the UWB device.

These and other objects are achieved according to the present invention by providing a novel circuit for generating wavelets that is highly integratable, and a two-mixer approach for using the wavelets for encoding a data stream while canceling the leakage introduced by non-ideal analog mixers.

In one embodiment, the wavelet generator uses two pulses, an early pulse and a late pulse, from a pulse generation circuit, that when mixed with a positive or a negative voltage in a conventional differential mixer, creates a wavelet that is either positive or negative (i.e., non-inverted or inverted). By mixing the pulse generator output with a stream of data (positive voltage for a '1', negative voltage for a '0'), a waveform having a sequence of wavelets is created are transmitted as a UWB signal. In a preferred embodiment, the mixer is a Gilbert cell mixer. In other embodiments, the mixer is, for example, a diode bridge mixer, or any electrically, optically, or mechanically-driven configuration of switching devices including, for example, an FET, a heterojunction, a bulk semiconductor device, or a micro-machine device.

In one embodiment of the two-mixer configuration for creating the UWB waveform, the noise introduced by the analog devices is canceled by whitening the output of the first mixer by mixing it with a white signal at the second mixer. In this embodiment, the data stream is divided into two derivative data streams, one of which is mixed with the pulse generator at the first analog mixer, and the other is mixed with the wavelets created by the first mixer. Since the derivative data streams are sufficiently white, mixing the result of the first mixer with the second derivative data stream will spread the unwanted spikes introduced by the first mixer. Moreover, in this embodiment, the two derivative data streams are at one-half the chipping rate of the original data stream, thereby reducing the power consumption by running at a lower clock rate.

In a second embodiment of the two-mixer configuration, a noisy signal is applied through an exclusive OR (XOR) to a single data stream. The result is then mixed with the pulse generator to create the wavelets at a first mixer. The result of the first mixer is then mixed with the noisy signal at the second mixer, again, to spread the unwanted spikes introduced by the first mixer.

Consistent with the title of this section, the above summary is not intended to be an exhaustive discussion of all the features or embodiments of the present invention. A more complete, although not necessarily exhaustive description of the features and embodiments of the invention is found in the section entitled "DESCRIPTION OF THE PREFERRED EMBODIMENTS" as well as the entire document generally.

BRIEF DESCRIPTION OF THE DRAWINGS

FIG. 9B is an illustration of the early and late pulses generated by the pulse generating circuit of FIG. 8;

FIG. 9C illustrates a bi-phase wavelet generated by the pulse generating circuit of FIG. 8 when the incoming data bit is high;

FIG. 9D illustrates a bi-phase wavelet generated by the pulse generating circuit of FIG. 8 when the incoming data bit is low;

FIG. 9E is a schematic diagram of a FET bridge differential mixer;

FIG. 9F is a schematic diagram of a diode bridge differential mixer;

DESCRIPTION OF THE PREFERRED EMBODIMENTS

Figure 1A:
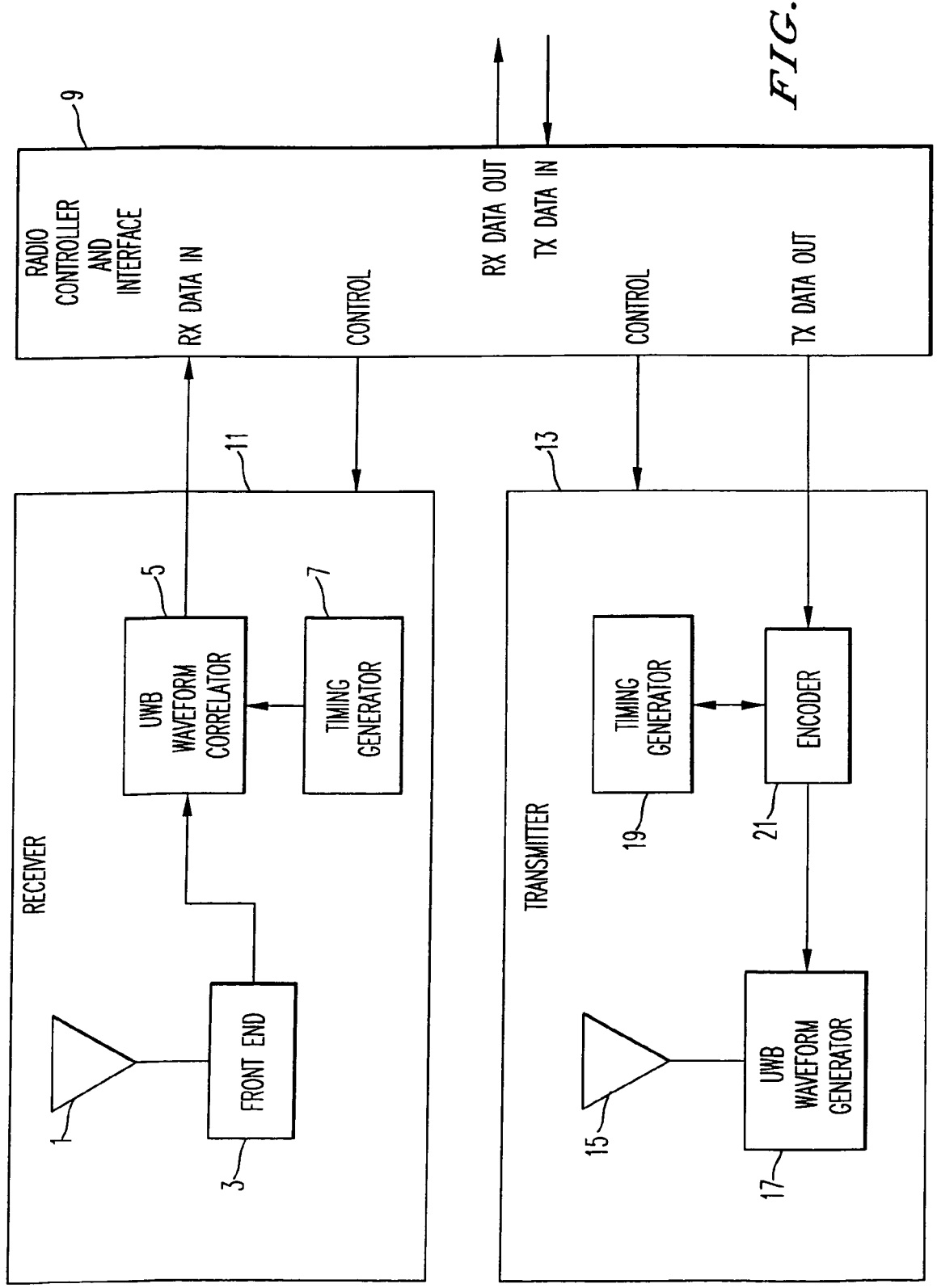
FIG. 1A is a block diagram of an ultra-wide band (UWB) transceiver, according to the present invention.

FIG. 1A is a block diagram of an ultra-wide band (UWB) transceiver. In FIG. 1A, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a, +a2, −a2, ..., +aN, −aN), (iii) quadratur phase signals (+1, −1, +j, −j), (iv) multiphase signals (1, −1, $\exp(+j\pi/N)$, $\exp(-j\pi/N)$, $\exp(+j\pi 2/N)$, $\exp(-j\pi 2/N)$, ..., $\exp(+j\pi(N-1)/N)$, $\exp(-j\pi(N-1)/N)$), (v) multilevel multi-phase signals ($a_i \exp(j2\pi\beta/N) | a_i \in \{1, a1, a2, ..., aK\}, \beta \in \{0, 1, ..., N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in$ {1, . . . , M}, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \quad (1)$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \quad (2)$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = \alpha_i \angle \theta_i$, where $a_1$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \quad (3)$$

In the above equation, the function $\Psi(\ )$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 4 below.

$$f_{B_{i,2}, B_{i,3}, B_{i,4}} = f_{\omega_i, k_i, b_i}(t) = e^{-[b_i t]^2} \sin(\omega_i t + k_i t^2) \quad (4)$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left( \frac{1}{e^{\frac{-(t-t1_i)}{.3*tr_i}} + 1} - \frac{1}{e^{\frac{-(t-t2_i)}{.3*tf_i}} + 1} \right) \cdot \sin(\theta_i + \omega_i t + k_i t^2) \quad (5)$$

where $\{B_{i,2}, B_{i,3}, B_{i,4}, B_{i,5}, B_{i,6}, B_{i,7}, B_{i,8}\} = \{t1_i, t2_i, tr_i, tf_i, \theta_i, \omega_i, k_i\}$ In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega=1$, tr=tf=0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25f_c$ and toward $2f_c$. A key attribute of the exemplary wavelets (or e.g., those described in co-pending U.S. patent application Ser. No. 09/209,460) is that the parameters are chosen such that neither f nor h in Equation 2 above has a DC component, yet f and h exhibit the required wide relative bandwidth for UWB systems.

Similarly, as a result of $B>0.25f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Figure 1B:
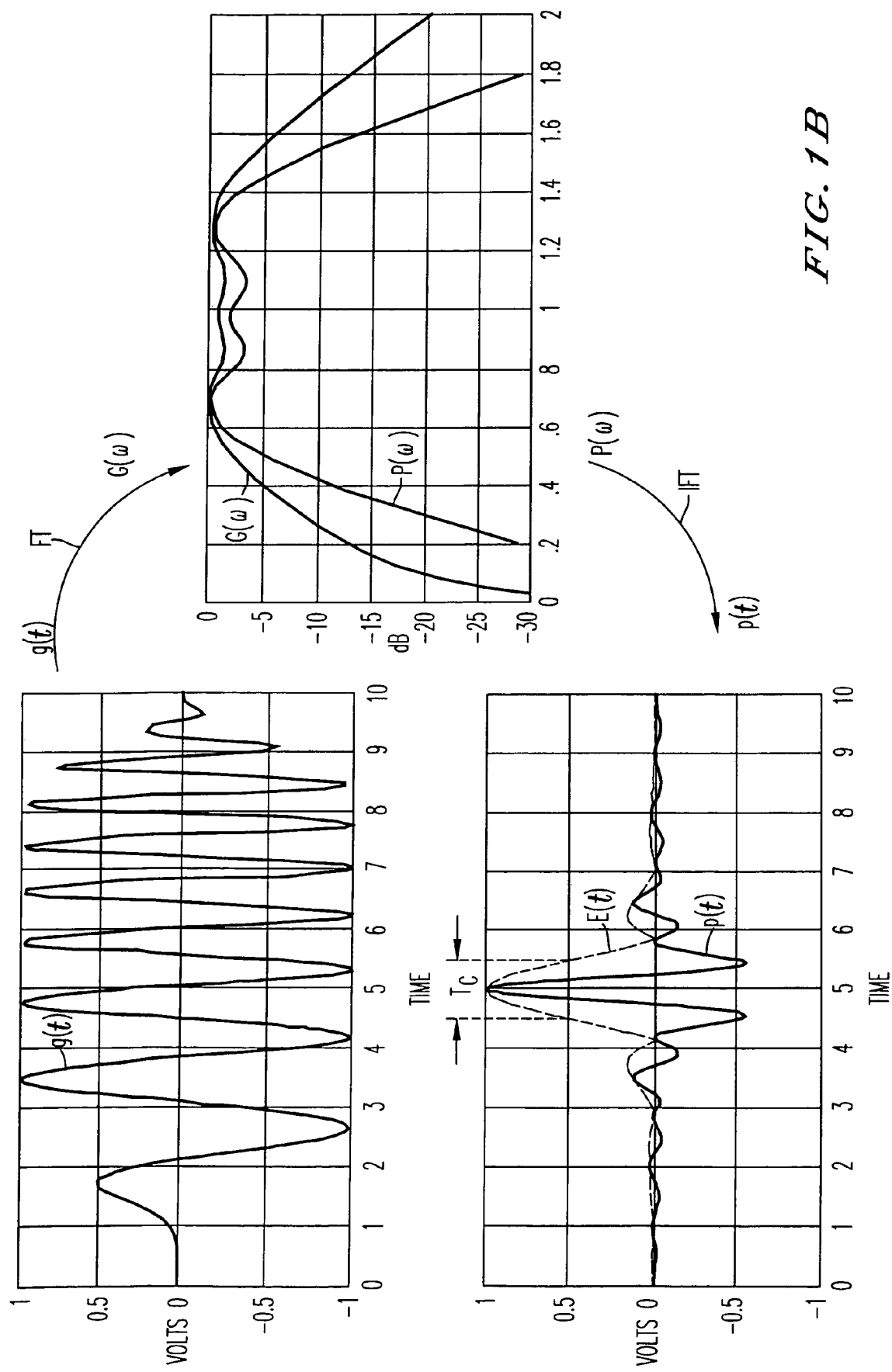
FIG. 1B is a diagram for illustrating the operation of the transceiver of FIG. 1a, according to the present invention.

The compressed (i.e., coherent matched filtered) pulse width of a UWB wavelet will now be defined with reference to FIG. 1B. In FIG. 1B, the time domain version of the wavelet thus represents g(t) and the Fourier transform (FT) version is represented by $G(\omega)$. Accordingly, the matched filter is represented as $G^*(\omega)$, the complex conjugate, so that the output of the matched filter is $P(\omega)=G(\omega)\cdot G^*(\omega)$. The output of the matched filter in the time domain is seen by performing an inverse Fourier transform (IFT) on $P(\omega)$ so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1B. The envelope waveform E(t) may be determined by Equation 6 below.

$$E(t)=\sqrt{(p(t))^2+(p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1A, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
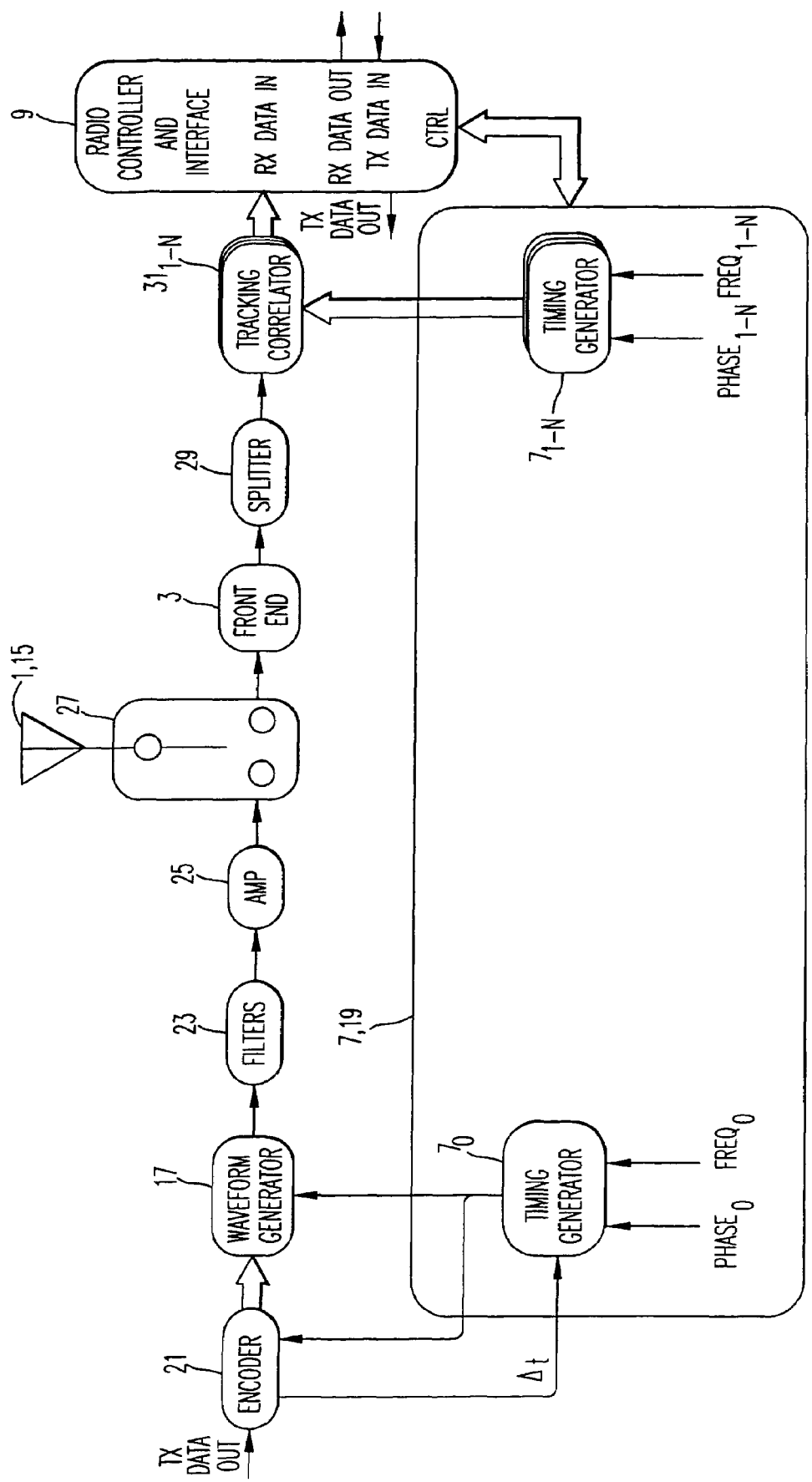
FIG. 2 is a block diagram of the transceiver of FIG. 1A, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1A) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$-$31_N$. Each of the tracking correlators $31_1$-$31_N$ receives a clock input signal from a respective timing generator $7_1$-$7_N$ of a timing generator module 7, 19, as shown in FIG. 2.

The timing generators $7_1$-$7_N$, for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$-$31_N$ (corresponding to the UWB waveform correlator 5 of FIG. 1A), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$-$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$-$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$-$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., $\Delta t$) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

The UWB transceiver of FIG. 1A or 2 may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 1A or 2 may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 3:
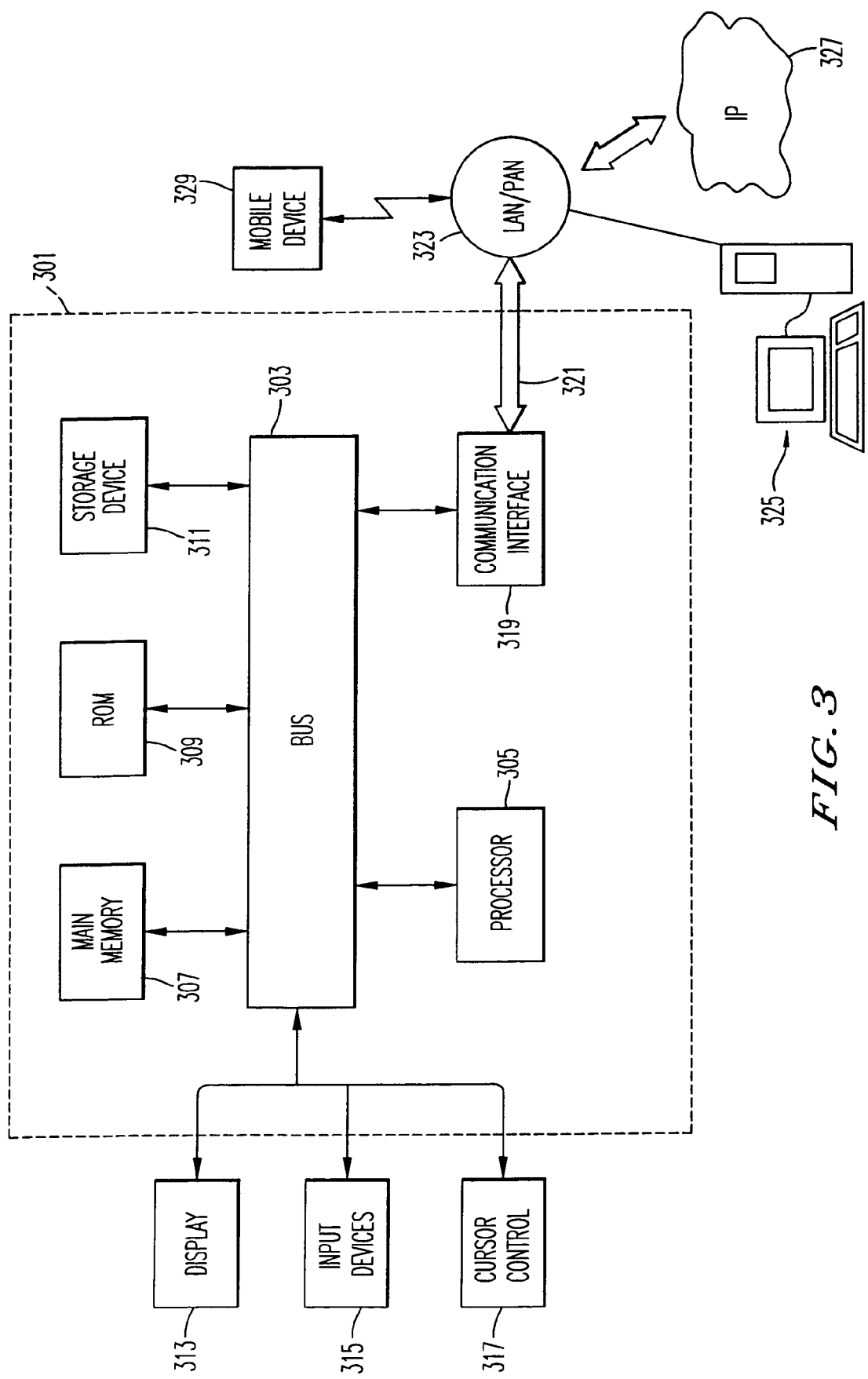
FIG. 3 is a schematic diagram of a general-purpose microprocessor-based or digital signal processor-based system, which can be programmed by a skilled programmer to implement the features of the present invention.

FIG. 3 illustrates a processor system 301 upon which an embodiment according to the present invention may be implemented. The system 301 includes a bus 303 or other communication mechanism for communicating information, and a processor 305 coupled with the bus 303 for processing the information. The processor system 301 also includes a main memory 307, such as a random access memory (RAM) or other dynamic storage device (e.g., dynamic RAM (DRAM), static RAM (SRAM), synchronous DRAM (SDRAM), flash RAM), coupled to the bus 303 for storing information and instructions to be executed by the processor 305. In addition, a main memory 307 may be used for storing temporary variables or other intermediate information during execution of instructions to be executed by the processor 305. The system 301 further includes a read only memory (ROM) 309 or other static storage device (e.g., programmable ROM (PROM), erasable PROM (EPROM), and electrically erasable PROM (EEPROM)) coupled to the bus 303 for storing static information and instructions for the processor 305. A storage device 311, such as a magnetic disk or optical disc, is provided and coupled to the bus 303 for storing information and instructions.

The processor system 301 may also include special purpose logic devices (e.g., application specific integrated circuits (ASICs)) or configurable logic devices (e.g, simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 301 may additionally include a compact disc reader, a compact disc reader-writer unit, or a compact disc juke box, each of which may be connected to the same device bus or another device bus.

The processor system 301 may be coupled via the bus 303 to a display 313, such as a cathode ray tube (CRT) or liquid crystal display (LCD) or the like, for displaying information to a system user. The display 313 may be controlled by a display or graphics card. The processor system 301 includes input devices, such as a keyboard or keypad 315 and a cursor control 317, for communicating information and command selections to the processor 305. The cursor control 317, for example, is a mouse, a trackball, or cursor direction keys for communicating direction information and command selections to the processor 305 and for controlling cursor movement on the display 313. In addition, a printer may provide printed listings of the data structures or any other data stored and/or generated by the processor system 301.

The processor system 301 performs a portion or all of the processing steps of the invention in response to the processor 305 executing one or more sequences of one or more instructions contained in a memory, such as the main memory 307. Such instructions may be read into the main memory 307 from another computer-readable medium, such as a storage device 311. One or more processors in a multi-processing arrangement may also be employed to execute the sequences of instructions contained in the main memory 307. In alternative embodiments, hard-wired circuitry may be used in place of or in combination with software instructions. Thus, embodiments are not limited to any specific combination of hardware circuitry and software.

As stated above, the processor system 301 includes at least one computer readable medium or memory programmed according to the teachings of the invention and for containing data structures, tables, records, or other data described herein. Stored on any one or on a combination of computer readable media, the present invention includes software for controlling the system 301, for driving a device or devices for implementing the invention, and for enabling the system 301 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 305 for execution. A computer readable medium may take many forms, including but not limited to, non-volatile media, volatile media, and transmission media. Non-volatile media includes, for example, optical, magnetic disks, and magneto-optical disks, such as the storage device 311. Volatile media includes dynamic memory, such as the main memory 307. Transmission media includes coaxial cables, copper wire and fiber optics, including the wires that comprise the bus 303. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 305 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 301 may receive the data on the telephone line and use an infrared transmitter to convert the data to an infrared signal. An infrared detector coupled to the bus 303 can receive the data carried in the infrared signal and place the data on the bus 303. The bus 303 carries the data to the main memory 307, from which the processor 305 retrieves and executes the instructions. The instructions received by the main memory 307 may optionally be stored on a storage device 311 either before or after execution by the processor 305.

The processor system 301 also includes a communication interface 319 coupled to the bus 303. The communications interface 319 provides a two-way UWB data communication coupling to a network link 321 that is connected to a communications network 323 such as a local network (LAN) or personal area network (PAN) 323. For example, the communication interface 319 may be a network interface card to attach to any packet switched UWB-enabled personal area network (PAN) 323. As another example, the communication interface 319 may be a UWB accessible asymmetrical digital subscriber line (ADSL) card, an integrated services digital network (ISDN) card, or a modem to provide a data communication connection to a corresponding type of communications line. The communications interface 319 may also include the hardware to provide a two-way wireless communications coupling other than a UWB coupling, or a hard-wired coupling to the network link 321. Thus, the communications interface 319 may incorporate the UWB transceiver of FIG. 2 as part of a universal interface that includes hard-wired and non-UWB wireless communications coupling to the network link 321.

The network link 321 typically provides data communication through one or more networks to other data devices. For example, the network link 321 may provide a connection through a LAN to a host computer 325 or to data equipment operated by a service provider, which provides data communication services through an IP (Internet Protocol) network 327. Moreover, the network link 321 may provide a connection through a PAN 323 to a mobile device 329 such as a personal digital assistant (PDA) laptop computer, or cellular telephone. The LAN/PAN communications network 323 and IP network 327 both use electrical, electromagnetic or optical signals that carry digital data streams. The signals through the various networks and the signals on the network link 321 and through the communication interface 319, which carry the digital data to and from the system 301, are exemplary forms of carrier waves transporting the information. The processor system 301 can transmit notifications and receive data, including program code, through the network(s), the network link 321 and the communication interface 319.

The encoder 21 and waveform generator 17 of the transceiver of the present invention function together to create a UWB waveform from a digital data stream by first, multiplying each bit of data in the data stream by an identifying code (e.g., an n-bit user code), thereby expanding each bit of data into a codeword of data bits equal in length to the length of the identifying code. In one embodiment, the codeword is then further processed to create two derivative codewords that are that are sent to the UWB waveform generator 17 where they are mixed with a pulse generator and recombined through a two-stage mixing process prior to being transmitted via the antenna 15.

As stated above, the encoder 21 receives a digital data stream from an external source via the radio and controller interface 9. The encoder 21 multiplies each bit of the digital data stream by a user code, which in one embodiment is a unique sequence of bits corresponding to a particular user.

For example, multiplying a user code of '1101 0110' by a data bit of '1' results in an 8-bit representation of the '1' that is identical to the user code, or '1101 0110.' On the other hand, multiplying that same user code by a data bit of '0' results in an 8-bit representation of the '0' that is the 8 bits of the user code inverted, or '0010 1001.'

Continuing with the above example, the encoder 21 multiplies the user code by each bit of the digital data stream to create a sequence of n-bit codewords, where n is the length of the user code. Once the digital data stream has been encoded, the UWB waveform generator 17 further processes the sequence of codewords in creating an UWB waveform that can be transmitted.

Figure 4A:
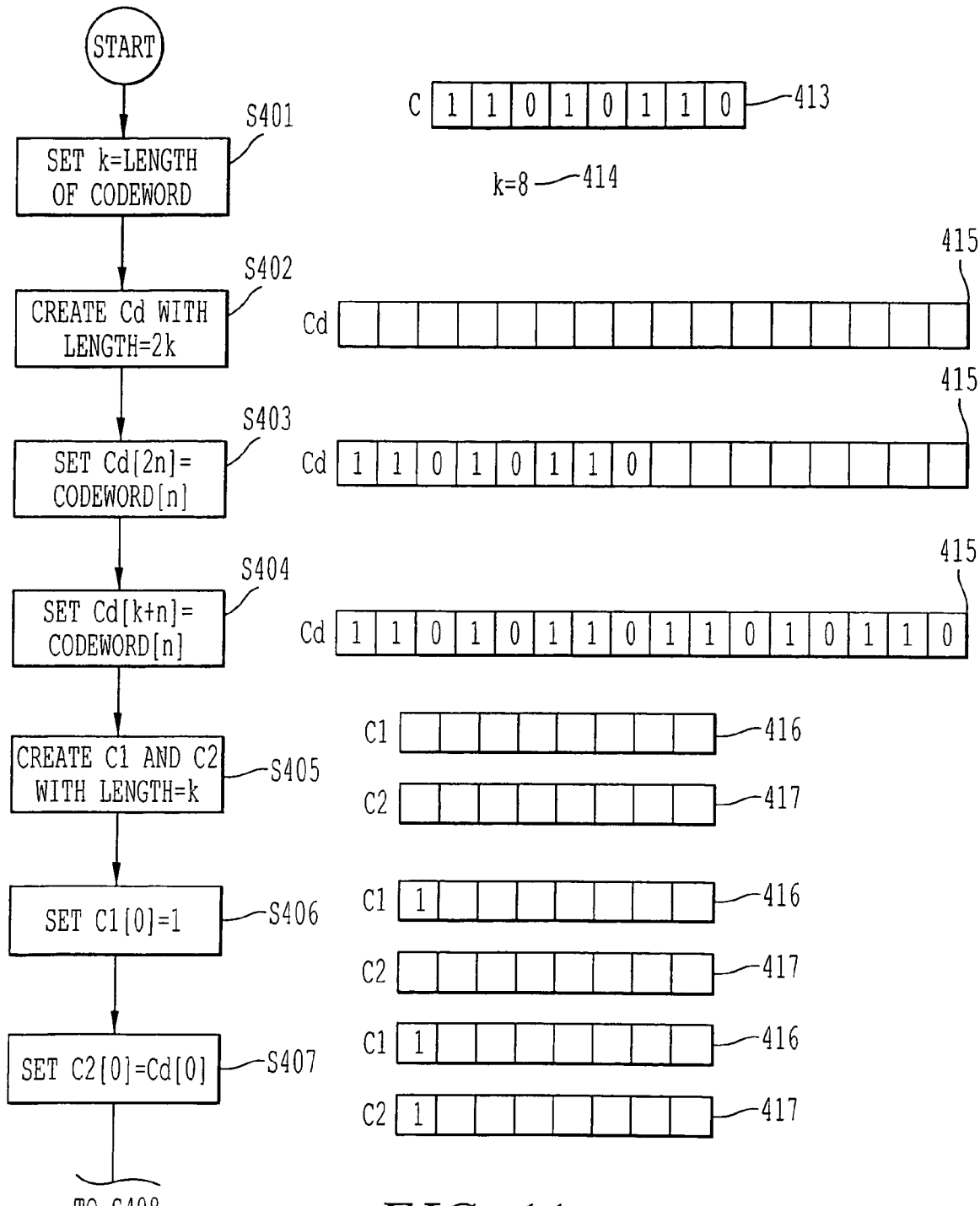
FIGS. 4A and 4B are a flow chart of a process implementing an algorithm used as a startup procedure for generating two derived codewords from an original codeword according to the present invention.
Figure 4B:
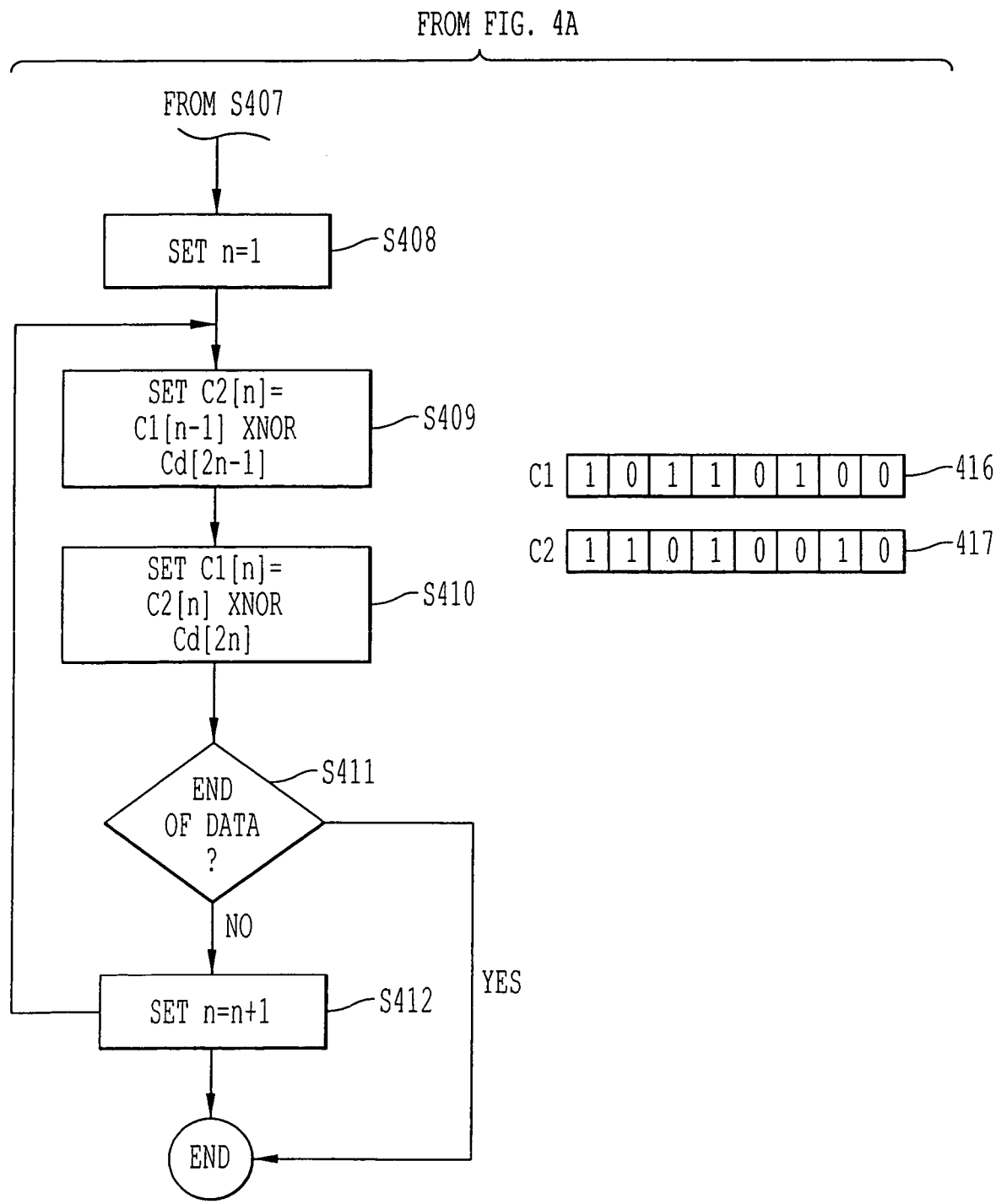

FIGS. 4A and 4B are a flow chart illustrating a process processing a sequence of n-bit codewords to create two derivative codewords that are later recombined and transmitted via the antenna 15, according to one embodiment of the present invention. In describing the process set forth in FIGS. 4A and 4B, an example will be used, an illustration of which is presented along with the flow chart of FIGS. 4A and 4B. In this example, an 8-bit codeword C 413 will be processed. In the example, C 413 is '1101 0110.'

The process begins at step S401 where k is set to the length of the codeword C 413. Accordingly, for the example, k is set to 8 (414). The process then proceeds to step S402 where an internal codeword $C_d$ 415 is created. The length of $C_d$ is equal to two times k in the present example. In the example, k was set to 8 at step S401, so the length of $C_d$ 415 is 16. The process then proceeds to step S403 where the first half of the internal codeword $C_d$ 415 is set to the original codeword C 413. Accordingly, following the example, bits 0-7 of internal codeword $C_d$ 415 are set to the values of bits 0-7 of original codeword C 413. The process then proceeds to step S404 where the upper half of the internal codeword $C_d$ 415 is also set to the values of the data bits in the original codeword C 413. Accordingly, at the completion of step S404, the internal codeword $C_d$ 415 includes the original codeword C 413 in both the lower and upper halfs.

Once the internal codeword $C_d$ 415 has been created, the process proceeds to step S405 where two derivative codewords $C_1$ 416 and $C_2$ 417 are created. Both $C_1$ 416 and $C_2$ 417 have a length equal to k, which is the length of the original codeword C 413. In the example, the length of $C_1$ 416 and $C_2$ 417 are both equal to 8 bits. In order to initialize the process, the initial values of $C_1$ [0] and $C_2$ [0] are set. Accordingly, at step S406, the $0^{th}$ bit of $C_1$ 416 is set to a value of '1.' The process then proceeds to step S407 where the $0^{th}$ bit of $C_2$ 417 is set to the $0^{th}$ bit of the internal codeword $C_d$ 415. Following the example, the $0^{th}$ bit of $C_2$ 417 is set to '1.' The algorithm now initializes a loop, and then enters a loop for populating all of the subsequent bits of derivative codewords $C_1$ 416 and $C_2$ 417. At step S408, the loop is initialized by setting an index n=1. The process then proceeds to step S409 where the $n^{th}$ bit of derivative codeword $C_2$ 417 is set equal to the value of $C_1$ [n−1] XNOR $C_d$ [2n−1]. As would be understood by one of ordinary skill in the digital logic art, an XNOR function results in a '1' when the two inputs have the same value. As shown in the example, applying step S409 for n=1, the $1^{st}$ bit of derivative codeword C2 417 is set to a value of 1, which is equal to $C_1$ [0] XNOR $C_d$ [1]. The process then proceeds to step S410 where the $n^{th}$ bit of $C_1$ 416 is set to $C_2$ [n] XNOR $C_d$ [2n]. In the example, for n=1, the $1^{st}$ bit of $C_1$ 416 is set to '0.'

The process then proceeds to step S411 where it is determined if the end of the sequence of codewords has been reached. If the end of the sequence of codewords has been reached (i.e., 'Yes' at step S411), the process ends. If however, the end of the sequence of codewords has not been reached (i.e., 'No' at step S411), the process proceeds to step S412 where the index of the loop is incremented. After the index of the loop has been incremented, at step S412, the process returns to the top of the loop, step S409, so that subsequent bits of the derived codewords $C_1$ 416 and $C_2$ 417 may be calculated.

As would be understood by one of ordinary skill in the encoding art or digital design art, steps S401-S408 are used to initialize the process. Accordingly, it can be seen that for a stream of codewords C 413, once step S409 has been reached, the process will continue in its loop until all bits of the stream of codewords have been processed. It would not be necessary to execute steps S401-S408 again unless there were a break in the data stream, thereby creating a need to reinitialize the algorithm.

Figure 5:
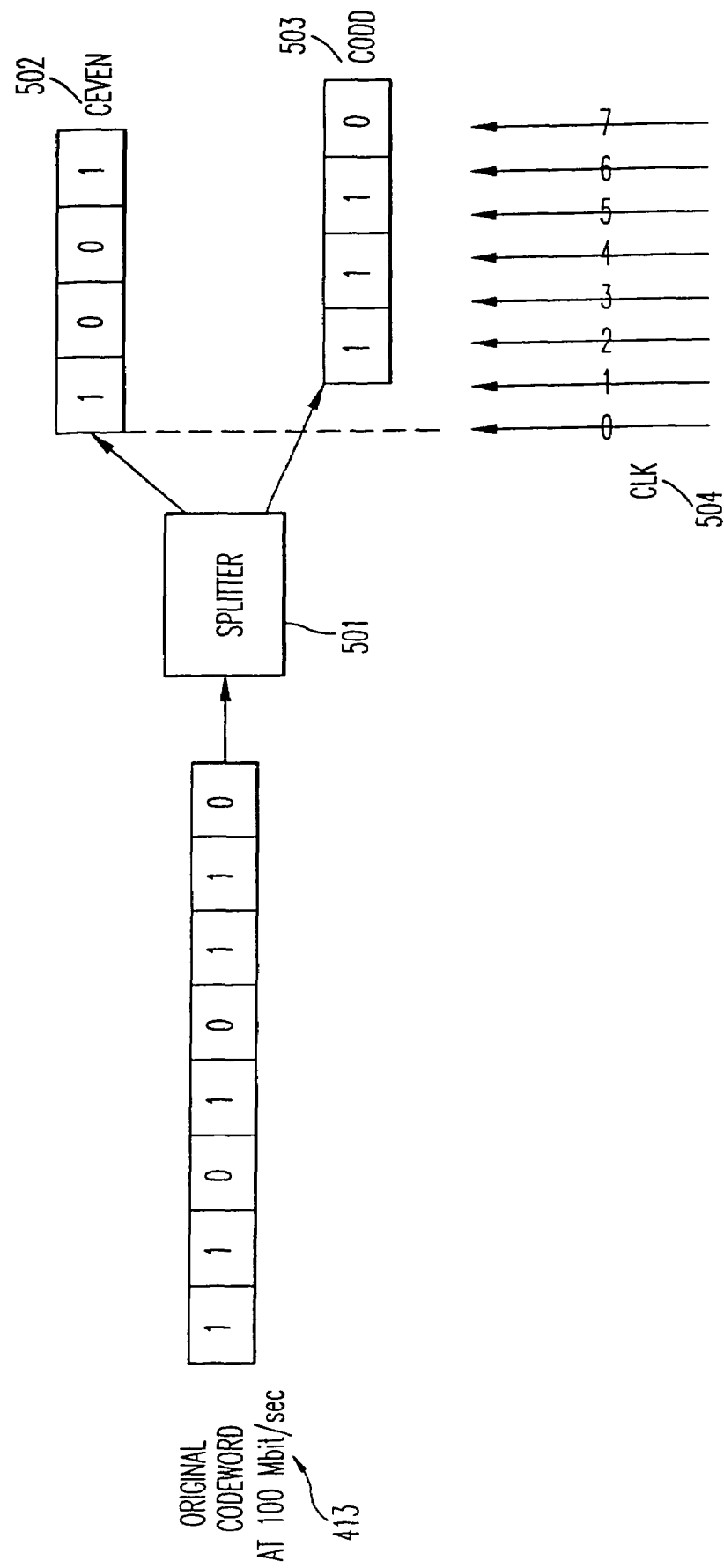
FIG. 5 illustrates a process flow for splitting a single original data stream into 2 data streams including even bits and odd bits of the original data stream, respectively, at one-half the chipping rate of the original data stream according to the present invention.
Figure 6:
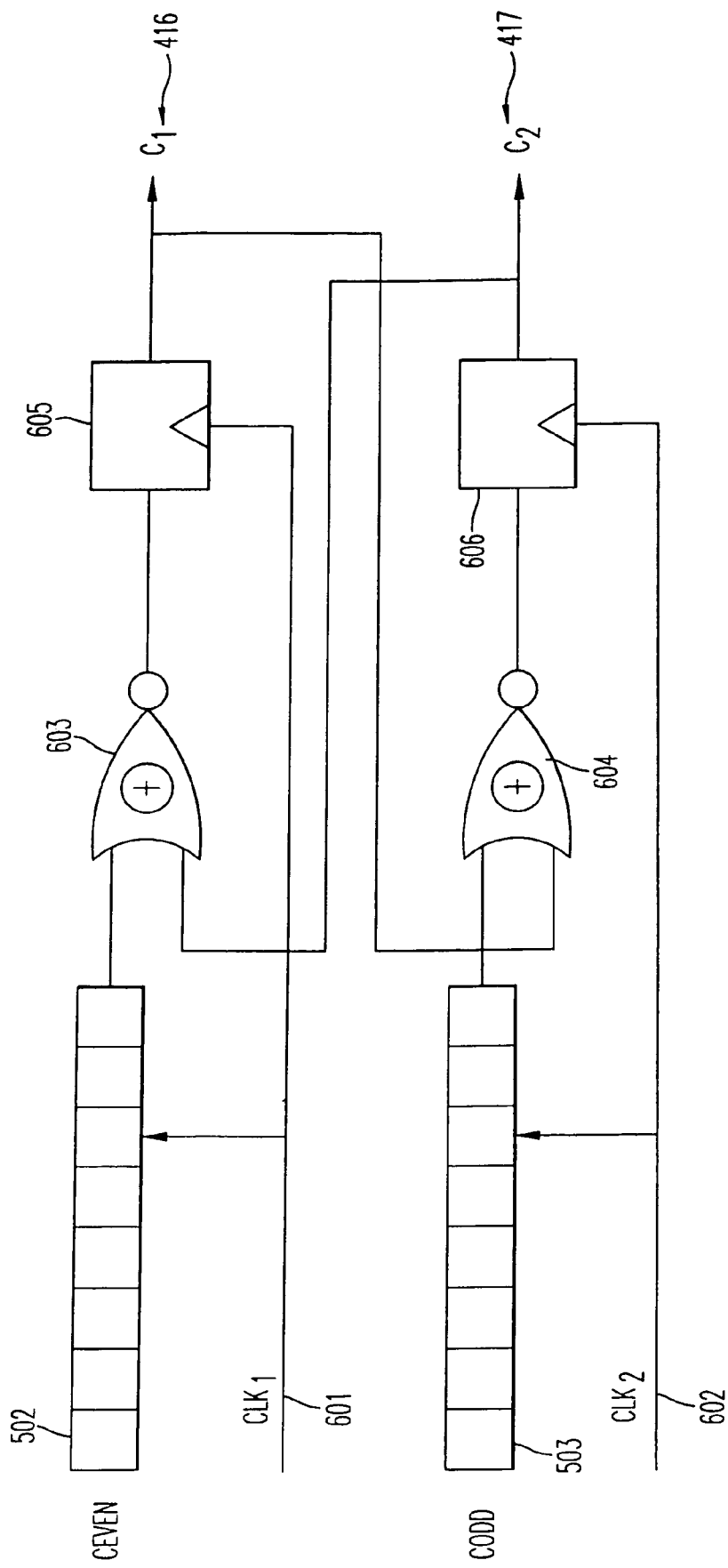
FIG. 6 is a schematic diagram of a logic circuit for creating two derived codewords from an even-bit data stream and an odd-bit data stream produced by the splitter illustrated in FIG. 5.
Figure 8:
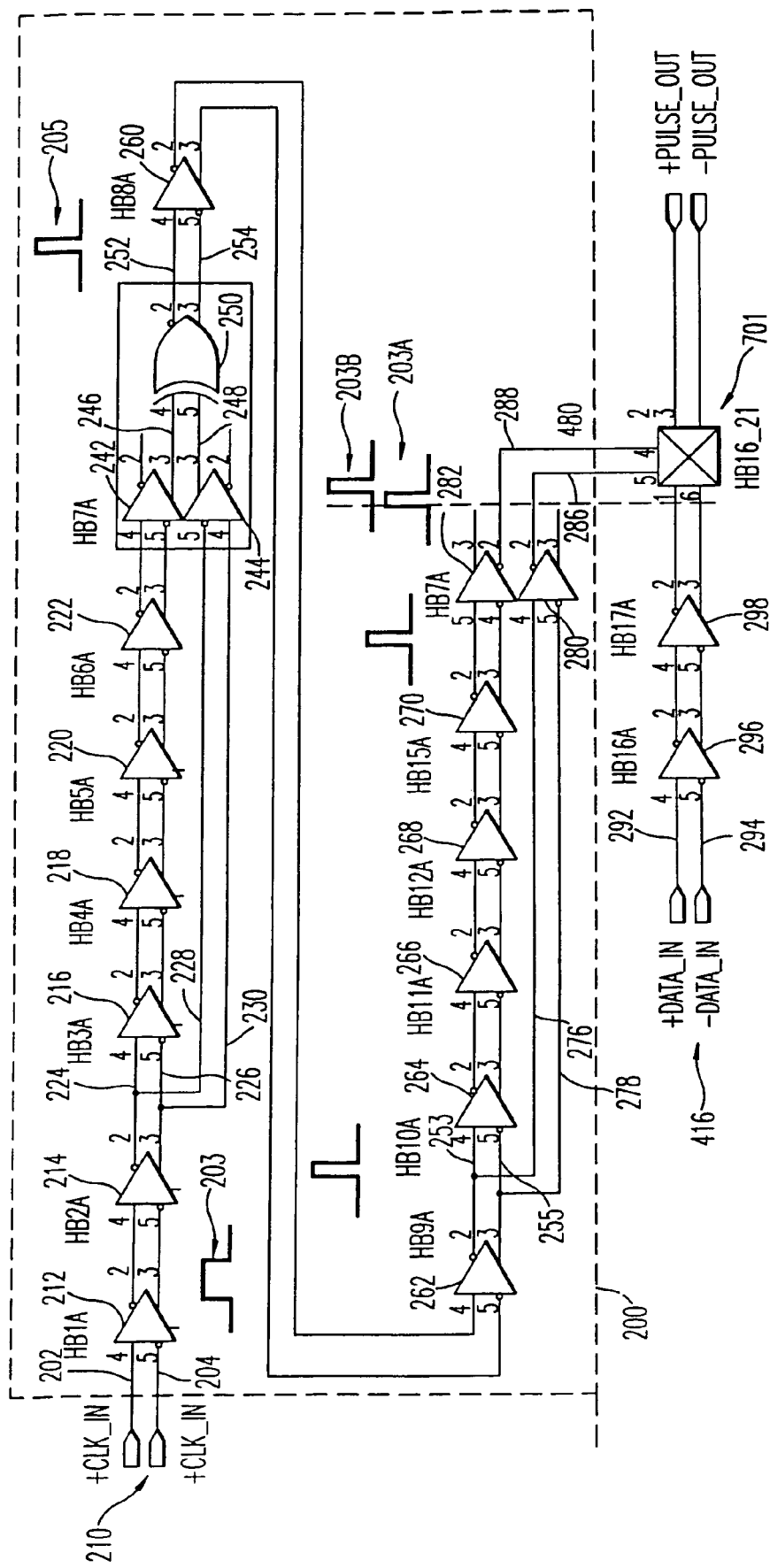
FIG. 8 is a schematic diagram of a circuit used to generate an early pulse and a late pulse according to one embodiment of the present invention.

FIGS. 5, 6, and 8 illustrate the circuit components used in implementing one embodiment of the present invention. In this embodiment, two derived codewords, such as $C_1$ 416 and $C_2$ 417 described by the algorithm in FIGS. 4A and 4B, are used in a two-stage mixer waveform generator. In this embodiment, the use of two derivative codewords allows for decreased power consumption within the circuitry, and the two-stage mixer waveform generator creates UWB waveforms that do not contain unwanted spectral spikes.

FIG. 5 is a process flow diagram showing an original codeword C 413 being split by a splitter 501 into two codewords, $C_{even}$ 502 containing the even bits of the original codeword C 413, and $C_{odd}$ 503, containing the odd bits of the original codeword C 413. As shown in FIG. 5, the original codeword C 413 enters the splitter 501 at 100 megabits per second (Mb/s). The splitter 501 samples C 413 at 100 Mb/s to create two codewords, $C_{even}$ 502 and $C_{odd}$ 503, each at 50 Mb/s. The clock CLK 504 samples the incoming codeword C 413 at 100 Mb/s placing the first sample into position 0 of $C_{even}$ 502, and the second sample into position 0 of $C_{odd}$ 503, and so on. Accordingly, since each of the two resultant code words, $C_{even}$ 502 and $C_{odd}$ 503 receive a new data bit on every other clock pulse, the resultant codewords contain every other bit of the original codeword C 413 at one-half the clock rate of the original codeword C 413, or 50 Mb/s in this example. Also, it should be noted that since $C_{odd}$ 503 receives its first bit on the second clock pulse, the resultant codewords, $C_{even}$ 502 and $C_{odd}$ 503 are 90° out of phase with one another. The results of the splitter 501 (i.e., $C_{even}$ 502 and $C_{odd}$ 503) are then provided to a logic circuit to create the two derivate codewords $C_1$ 416 and $C_2$ 417 that were created by the process described in FIG. 4.

FIG. 6 shows a logic circuit for creating the two derived codewords $C_1$ 416 and $C_2$ 417 from the $C_{even}$ 502 and $C_{odd}$ 503 codewords created by the splitter 501 in FIG. 5. As shown in FIG. 6, the logic circuit includes two exclusive NOR (XNOR) gates 603 and 604, two latches 605 and 606, and two clocks $CLK_1$ 601 and $CLK_2$ 602. $CLK_1$ 601 and $CLK_2$ 602 are 90° out of phase with one another. By processing two half-speed data streams, $C_{even}$ 502 and $C_{odd}$ 503, the power consumption of this circuit is lower than that required to process a data stream running at twice the rate. Low power consumption is favorable when configuring a transceiver for mobile devices such as PDAs and mobile telephones since maximizing battery life is a design goal. The logic circuit of FIG. 6 generates the two derived code words $C_1$ 416 and $C_2$ 417 as described in the context of the process flow in FIG. 4. Both $C_1$ 416 and $C_2$ 417 are the same length as the original codeword C 413, are at half the data rate of the original codeword C 413, and are 90° out of phase with one another. Once the derived codewords have been created, they are sent to a two-stage mixer by which a UWB waveform is generated.

Figure 7:
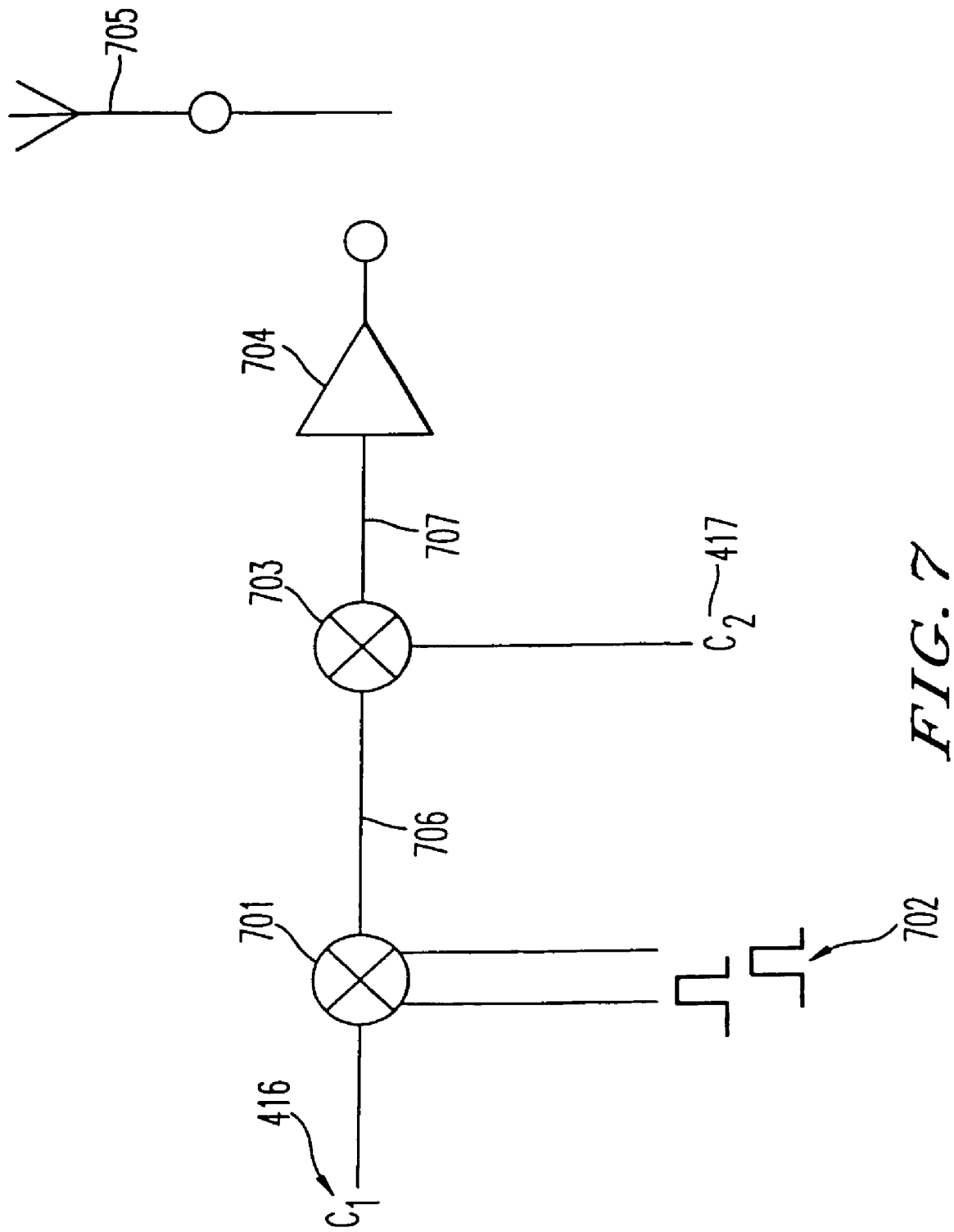
FIG. 7 is a schematic diagram of a two-stage differential mixer for generating low-noise wavelets according to one embodiment of the present invention.

FIG. 7 is a schematic diagram of a two-stage mixer for generating a UWB waveform in one embodiment of the present invention. As shown in FIG. 7, derived codeword $C_1$ 416 is mixed at a first mixer 701 with the output of an early/late pulse generator 702. The early/late pulse stream runs at twice the chipping rate of derived codeword $C_1$ 416. In this example, $C_1$ 416 is a data stream at 50 Mb/s, and the early/late pulse stream 702 is at 100 Mb/s. The output of the simple wavelet generator 707 is a pulse stream of single-cycle bi-phase wavelets.

In other embodiments, the simple wavelet generator 707 may be replaced by more circuits to implement more complex modulation schemes such as those described in co-pending application incorporated by reference above Ser. No. 09/685,205, entitled SYSTEM AND METHOD FOR GENERATING ULTRA WIDEBAND PULSES, now issued as U.S. Pat. No. 7,010,056. For example, the output of the wavelet generator may be a pulse stream of pulses having a variety of shapes and/or amplitudes. By controlling the shapes of the wavelets generated, multiple bits of data may be encoded therein.

FIG. 8 is a schematic diagram of a circuit for generating a UWB waveform in one embodiment of the present invention. As shown in FIG. 8, data 416 is mixed at a first mixer 701 with the outputs of an early/late pulse generator 200. The early/late pulse streams run at the chipping rate. The chipping rate can be the same as the data rate of derived input data 416, in which case a single wavelet, or chip, is transmitted for each bit. The chipping rate may also be an integer multiple of the data rate of the derived input data 416. In such a case, each bit is made up of a predetermined number of bits. For example, if the data stream 416 is at 50 Mb/s and there are 16 chips per bit, then the early/late pulse streams 286, 288 are at 800 MHz.

As shown in FIG. 8, the pulse generator 200 receives its input from a differential clock 210 which generates a pulse 203, which is differentially transmitted on lines 202 and 204. Input lines 202, 204 feed into the first of a set of seven buffers 212, 214, 216, 218, 220, 222, and 224 connected in series. While seven buffers are shown in this first series-connected set of buffers, it would be understood by one of ordinary skill in the art that other numbers of buffers could be used to provide a different time delay through the set. Buffers 214 and 216 are connected in series via lines 224, 226. In the preferred embodiment disclosed in FIG. 8, data lines 228 and 230 branch off from lines 224 and 226 respectively and serve as inputs to buffer 244. The output of buffers 242 and 244 serve as inputs via lines 246, 248 to an exclusive OR gate 250, which generates a pulse 205. In another embodiment, an AND gate could be used in place of the exclusive OR gate 250, where the inverting output of one of either buffer 242 or buffer 244 is used to feed the AND gate instead of the non-inverting output. An AND gate provides some advantages since the AND gate generates a pulse only on the rise of the pulse, whereas an exclusive OR gate 250 gives a pulse both on the rise and the fall of the pulse. Therefore, timing of the circuit is less difficult to implement with an AND gate. The output of the exclusive OR gate 250 is a differential pulse 205 which feeds into another series-connected set of buffers, in this example, seven buffers 260, 262, 264, 266, 268, 270, and 282 via lines 252, 254. Buffers 262 and 264 are connected in series via lines 253 and 255. In the preferred embodiment disclosed in FIG. 8, data lines 276 and 278 branch off from lines 253 and 255 respectively and serve as inputs to buffer 280. The output from buffers 280 and 282 feed into differential mixer 701 via lines 286 and 288. The differential mixer 701 receives the data stream from encoder 21 over lines 292, 294.

The function of the pulse generator 200 shown in FIG. 8 will now be described. The clock 210 generates a differential semi-square wave clock signal 203, which are transmitted over lines 202, 204 to buffer 212. Buffer 212 serves to amplify, saturate, and generally square up the incoming signal, and then buffer 214 squares it up some more. The transmission of the clock signal 203 through two paths, one through buffers 216, 218, 220, 222, and 242, and the other through buffer 244, causes the clock signal to reach the output of buffer 244 before it reaches the output of buffer 242. In other words, the output of buffer 244 leads the output of buffer 242 by the delay accumulated in buffers 216, 218, 220, and 222. Since the inputs to the exclusive OR gate 250 are matched except at the clock transitions, pulse 205 is generated at the output of exclusive OR gate 250 at each transition of the clock. The pulse stream, therefore, is at twice the clock frequency because an exclusive OR gate 250 generates a pulse on both leading and trailing clock transitions.

In another embodiment, an AND gate could be used in place of the exclusive OR gate 250, where the inverting output of either buffer 242 or buffer 244 is used to feed the AND gate instead of the non-inverting output. Since the inputs to the AND gate are mismatched except at the leading clock edge transition (if the inverting output of buffer 242 is used), or the trailing clock edge transition (if the inverting output of buffer 244 is used) the output of the AND gate is a pulse stream that equals the clock frequency. An AND gate provides some advantages since the AND gate generates a pulse only on the rise or fall of the pulse, whereas an exclusive OR gate 250 gives a pulse both on the rise and the fall of the pulse. Therefore, the duty-cycle of the clock does not have to be exactly 50% in order to have an equal time period between all pulses. Instead, the duty cycle can be anything, making the circuit is less difficult to implement.

The pulse 205 is transmitted over differential lines 252 and 254 to buffer 260. Buffer 260 serves to amplify, saturate, and generally square up the pulse and then buffer 262 squares it up some more. The transmission of the pulse 205 through two paths, one path via differential lines 253 and 255 through buffers 264, 266, 268, 270, and 282, and the other path via differential lines 246 and 248 through buffer 280 causes the pulse 205 to reach the output of buffer 280 before it reaches the output of buffer 282. In other words, output 286 of buffer 280 leads output 288 of buffer 282 by the delay accumulated in buffers 264, 266, 268, and 270. Accordingly, line 286 has an early pulse and line 288 has a late pulse, making pulse streams 203a and 203b respectively.

The early pulse on line 286 feeds the non-inverting differential LO input of multiplier 701. The late pulse on line 288 feeds the inverting differential LO input of multiplier 701. The differential data-source 416 generates data, which is differentially transmitted on lines 292 and 294. Input lines 292 and 294 feed into the first of a set of two series-connected buffers 296 and 298. The differential output data from buffer 298 drives the differential RF-input port of multiplier 701. Given the data on the RF-port of multiplier 701, and the early and late pulse on the non-inverting and inverting input lines of the differential LO-port of multiplier 701, the output of the multiplier is the desired wavelet shape. When the data is a '1,' the output wavelet has a ground-positive-negative-ground shape, and when the data is a '0,' the output wavelet has a ground-negative-positive-ground shape.

Figure 9A:
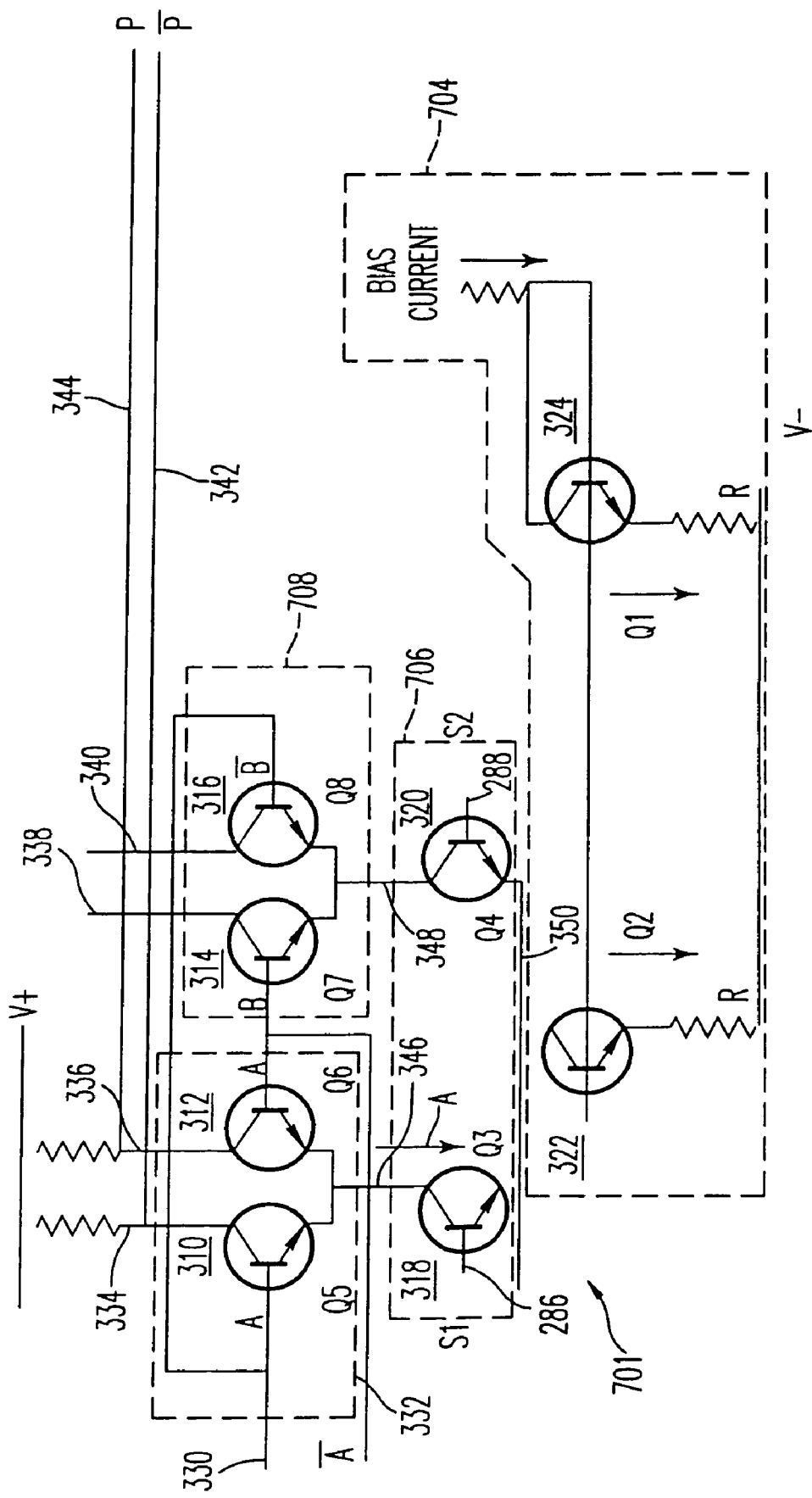
FIG. 9A is a schematic of a Gilbert cell differential mixer.

FIG. 9A is a schematic diagram of a transistor-based Gilbert cell differential mixer used in one embodiment of the present invention. In this embodiment, it is shown that mixing the resultant early/late pulse streams 286, 288 generated by the pulse generator 200 shown in FIG. 8, the result is a sequence of bi-phase wavelets corresponding to the input data 416. In other embodiments of the present invention, the wavelets generated may have different shapes, such as, but not limited to multilevel and/or quad-phase wavelets. Accordingly, if different encoding schemes are used, different amounts of information may be encoded in any single wavelet, thereby affecting the data rates achievable at a given chip rate.

As would be understood by one of ordinary skill in the art, FIG. 9A is a schematic diagram of a bipolar transistor-based Gilbert cell differential multiplier. It is capable of multiplying the differential signal across 330 and 332, by the differential signal across 286 and 288, the product appearing across the differential output 340 and 342. It includes a current mirror 704, which provides a current that will be steered between the differential output nodes 340 and 342. Differential pair 706 steers the current between two paths, the first path to differential pair 710, and the second path to differential pair 708. Differential pair 710 and differential pair 708 are connected to differential input lines 330 and 332, and to the differential output nodes 340 and 342 so as to oppose one another, (i.e., if the differential input 330 is high, then differential pair 710 steers its current to pull 342 low but differential pair 708 steers its current to pull 342 high). The pair that dominates is determined by which has the most current available to it, which is determined by differential pair 706. Differential pair 706 accepts differential inputs 286 and 288. When 286 is higher than 288, the current is steered to differential pair 710 and the output 340 is inverted from input 330 (i.e., multiplying by −1). When 288 is higher than 286, the current is steered to differential pair 708 and the output 340 is not inverted from input 330 (i.e., multiplying by +1). When 286 is equal to 288, the current is steered identically to the output nodes 340 and 342 so that the output is independent of the input 330 and 332 (i.e., multiplying by zero). Accordingly, by mixing the early/late pulses shown in FIG. 9B with a high input to A 330, the output waveform will be of the form shown in FIG. 9C. On the other hand, by mixing the early/late pulses shown in FIG. 9B with a low input to A 330, the output waveform will be of the form shown in FIG. 9D.

In other embodiments, the wavelet generating function of the differential mixer 701 is accomplished using, for example, bridge circuits using switches. The can be electronically controlled switches such as an FET-bridge mixer 702 of FIG. 9E or a diode-bridge mixer 703 of FIG. 9F. In other embodiments, the switches are mechanical, using, for example, MEM (micro electromechanical machine) technology, or optically driven switches such as a bulk semiconductor material. In various embodiments of the present invention, all of the ports of the mixer are differential or all of the ports of the mixer accept digital inputs, or both.

Using a differential mixer to generate the UWB wavelets according to the present invention provides advantages over conventional methods. For example, using a conventional method of passing a pulse through one or more transmission line stubs to create a waveform includes using components (i.e., the stubs) that are not integratable. Accordingly, the conventional approach uses up more space, which is of a premium when designing UWB wireless devices. Accordingly, by using highly integratable components, such as transistor-based differential components in combination with the pulse generator 200 described above, the present invention provides a highly integratable solution for creating UWB wavelets, even into the microwave regime.

Returning to FIG. 7, the output of the simple wavelet generator 707 in this embodiment is a series of wavelets at twice the rate of the input derivative codeword $C_1$ 416. Accordingly, for each bit of data in the codeword $C_1$ 416, there are two wavelets output from the first differential mixer 701. For example, if the first bit of the input derivative codeword $C_1$ 416 is a '1,' the output of the first differential mixer 701 will be two wavelets, each looking similar to the waveform shown in FIG. 9c. On the other hand, if the first bit input from the derivative codeword $C_1$ 416 is a '0,' the output of the first differential mixer 701 will be two wavelets, each looking similar to the waveform shown in FIG. 9D.

Figure 10:
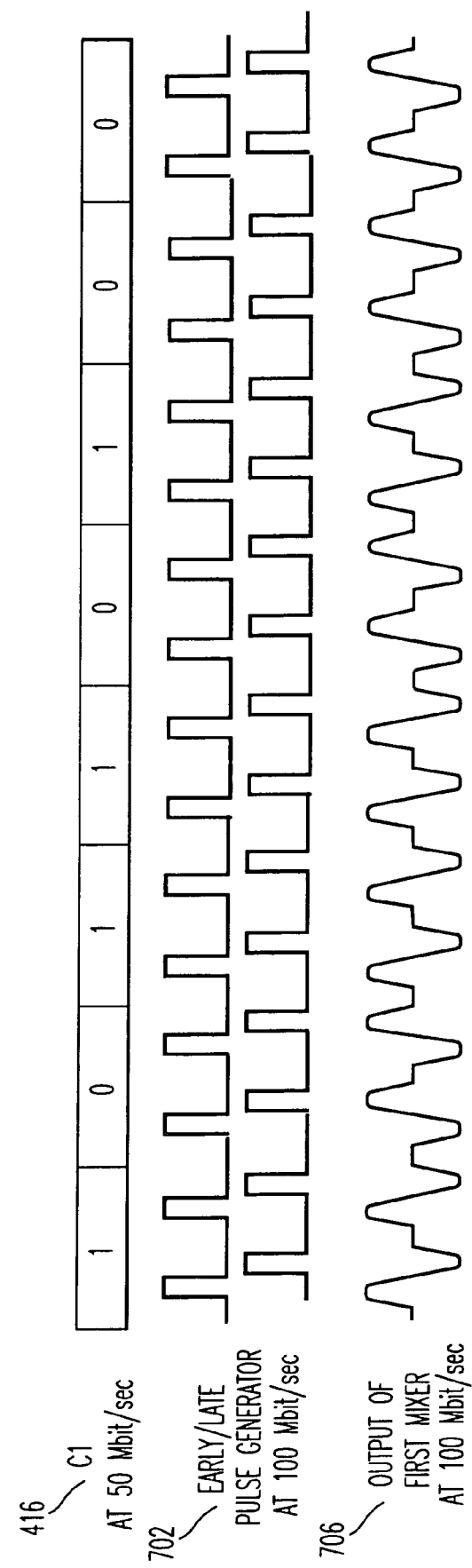
FIG. 10 is an exemplary timing chart illustrating the inputs and outputs of the first differential mixer of the two-stage mixer according to one embodiment of the present invention.

FIG. 10 shows a timing chart of the simple wavelet generator 707 using the same example as was used in the description of the algorithm in FIG. 4. As shown in FIG. 10, the input derivative codeword $C_1$ 416 is an 8-bit codeword (i.e., '1011 0100'), at 50 Mbit/s. The simple wavelet generator 707 provides a series of early and late pulses that are mixed with the derivative codeword $C_1$ 416 at the first differential mixer 701. The output of the first differential mixer 706 is a series of two individual wavelets per bit of data from the derivative codeword $C_1$ 416. The wavelets are positive then negative as shown in FIG. 9C corresponding to each data bit that is a '1.' On the other hand, for data bits that are '0,' the wavelets are inverted, thereby similar to the waveform shown in FIG. 9D. Accordingly, the output of the simple wavelet generator 707 is a series of data-encoded wavelets that are provided as an input into the second differential mixer 703, shown in FIG. 7.

Figures 11A, 11B:
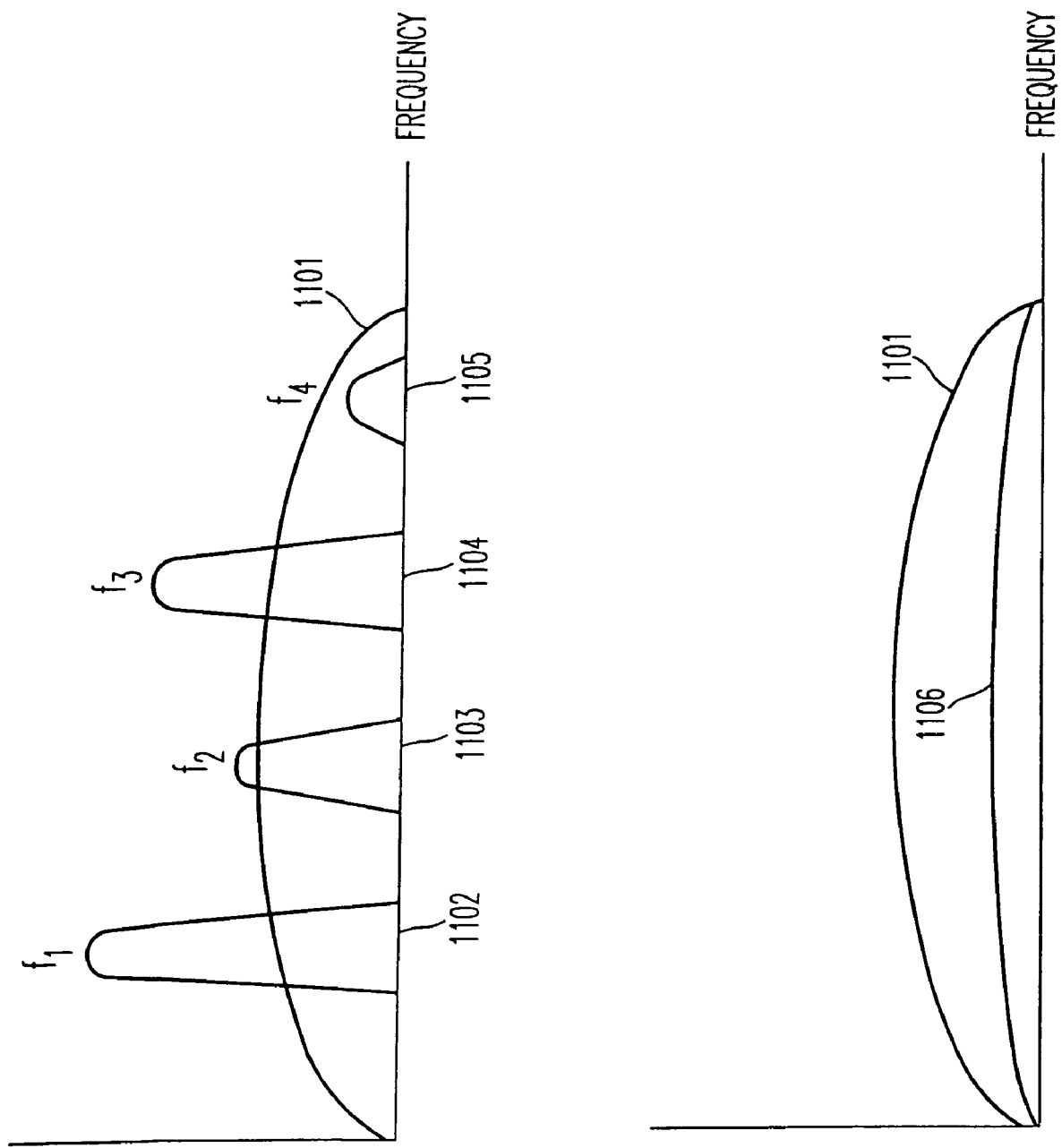
FIGS. 11A and 11B are graphs that illustrate the spectral spikes produced by non-ideal analog devices and the whitening of those spikes.

FIGS. 11A and 11B illustrate the spectral spikes that are created by non-ideal analog devices such as the first differential mixer 701. As shown in FIG. 11A, the output of the first differential mixer includes not only the desired signal 1101, shown in the frequency domain, but also unwanted spectral spikes at the fundamental frequency $f_1$ 1102, and its harmonics (e.g., $f_2$ 1103, $f_3$ 1104, and $f_4$ 1105), as well as other noise generated by the first differential mixer 701. By creating two derivative codewords $C_1$ 416 and $C_2$ 417, the inventors have developed an approach for using a two-stage mixing technique that will sufficiently spread the spectrum of the unwanted spikes generated at the first differential mixer 701. By mixing the output of the first differential mixer 701 with the sufficiently-white second derivative codeword $C_2$ 417 at a second differential mixer 703, the energy contained in the unwanted spikes is whitened (i.e., spread over a large band). As illustrated in FIG. 11B, the spectral spikes 1106 have been spread, or "whitened," so that they are below the signal level of the desired signal 1101. The benefits of the two-stage mixing technique may be gained through various embodiments of the present invention, as would be well understood by one of ordinary skill in the digital signal processing art based on the present discussion. The embodiment shown in FIG. 7 using two derivative codewords $C_1$ 416 and $C_2$ 417 is only one exemplary one technique for using a two-stage mixing approach to eliminate spurious spectral spikes caused by non-ideal analog devices such as the differential mixers 701 and 703 used to generate a UWB waveform.

Returning to FIG. 7, the output of the first differential mixer 706 is mixed with the second derivative codeword $C_2$ 417 at the second differential mixer 703. As described above, the second derivative codeword $C_2$ 417 is at half the data rate of the original codeword C 413, is 90° out of phase with the first derivative codeword $C_1$, and accordingly, at half the data rate of the output of the first differential mixer 706. The second differential mixer 703 is the same type of device as the first differential mixer 701.

Figure 12:
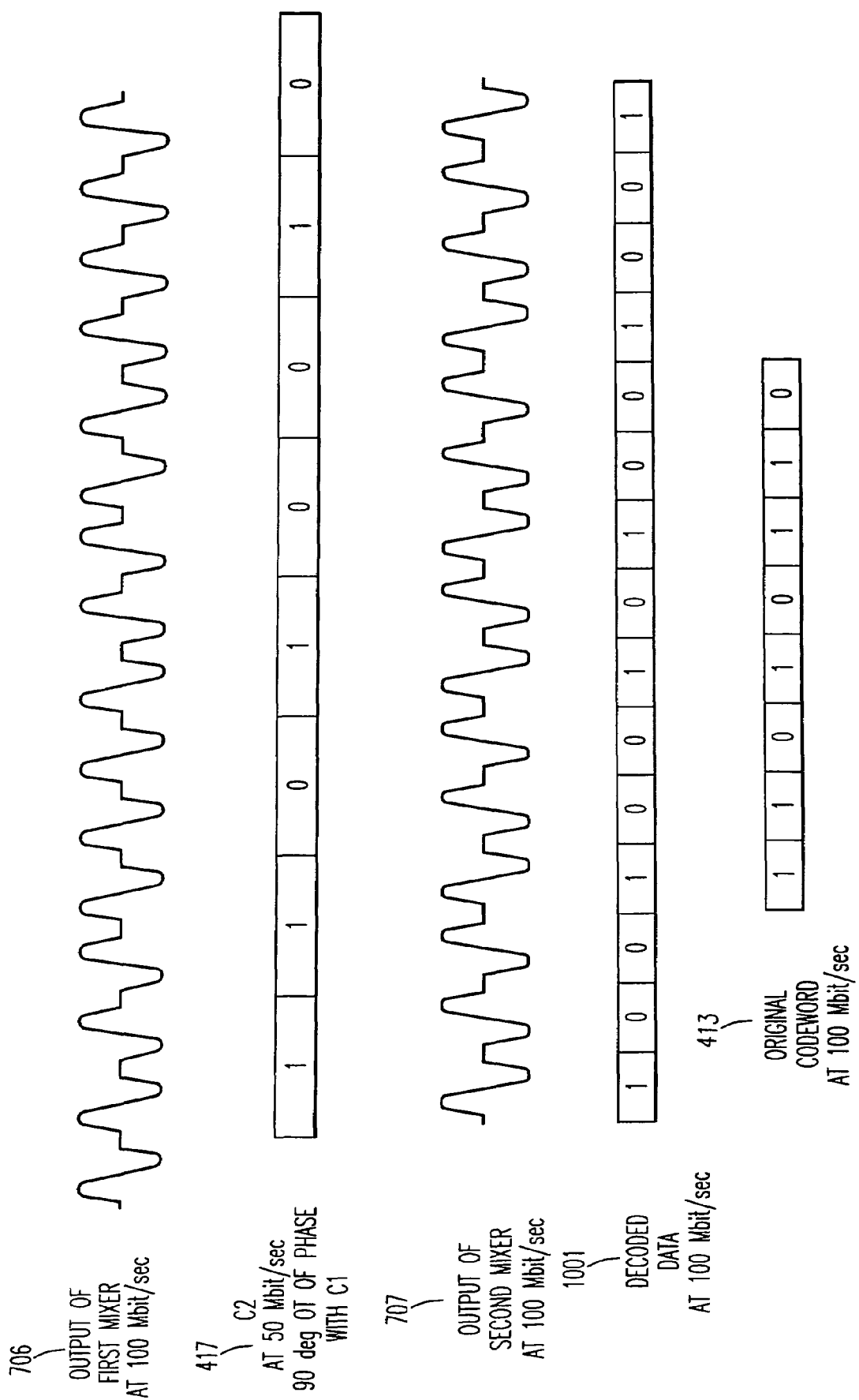
FIG. 12 is an exemplary timing chart illustrating the inputs and outputs of the second differential mixer of the two-stage mixer according to one embodiment of the present invention.

FIG. 12 is a timing chart of the second differential mixer 703. As shown in FIG. 12, the output of the first differential mixer 706 is a series of wavelets at twice the clock speed of the second derivative codeword $C_2$ 417. Furthermore, the output of the first mixer 706 is 90° out of phase with the second derivative codeword $C_2$ 417, as discussed above. The second differential mixer 703 will invert the waveform output from the first differential mixer 701 when the bit of the second derivative codeword $C_2$ 417 is a '0.' When the data bit of the second derivative codeword $C_2$ 417 is a '1,' the output of the first differential mixer 706 will not be inverted at the second differential mixer 703. The output of the second differential mixer 707 will be a series of wavelets, each wavelet corresponding to a '1' if the wavelet has a shape similar to that shown in FIG. 9C, or corresponding to a '0' if the wavelet has a form similar to that shown in FIG. 9D. The data rate of the output of the second differential mixer 707 will be equal to that of the original codeword C 413.

To complete the example, the resultant waveform output from the second differential mixer 707 can be decoded into ones and zeros 1001 as shown in FIG. 12. When comparing the decoded data 1001 with the original codeword C 413, it can be seen that an inverted representation of the original codeword C 413 is contained in the decoded data 1001. It should be noted that a continuous stream of data were used in the example, after an initialization of the algorithm had taken place, a continuous stream of inverted input data would be contained in the output of the second differential mixer 707.

Returning to FIG. 7, the output of the second differential mixer 707 is passed through an inverting amplifier 704 and then coupled to an antenna 705 so that the data may be propagated through space.

Figure 13:
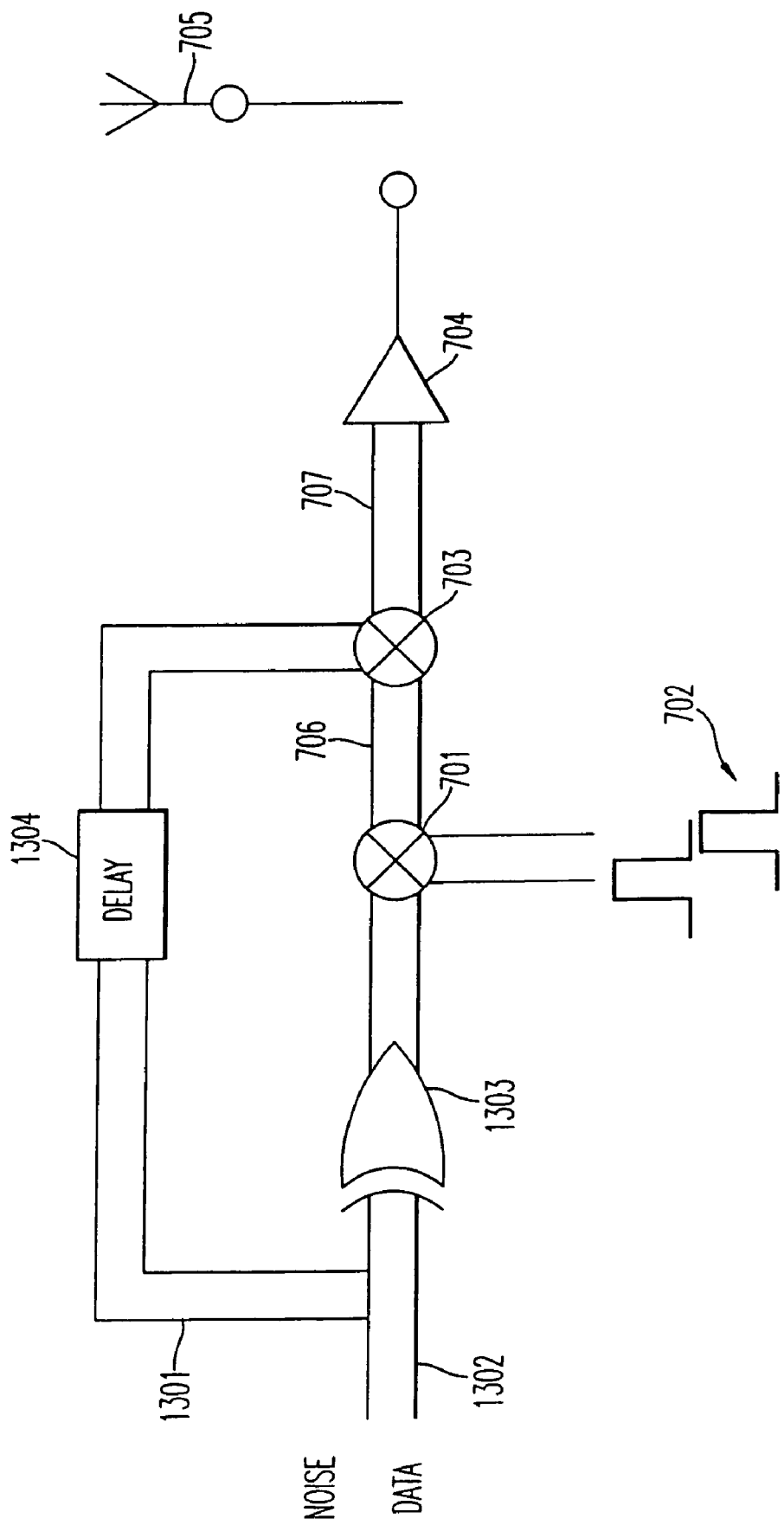
FIG. 13 is a schematic diagram of a two-stage differential mixer for generating low-noise wavelets by mixing the data stream with noise according to one embodiment of the present invention.

FIG. 13 shows another embodiment of the present invention, where it is not necessary to generate derivative codewords such as $C_1$ 416 and $C_2$ 417 in order to gain the advantages of the two-stage mixing approach. As shown in FIG. 13, a sufficiently-white random sequence 1301 is combined with the original data stream 1302 at an exclusive OR (XOR) gate 1303. The output of the XOR gate 1303 is mixed with the output of the early/late pulse generator 702, as shown in FIG. 7, at a first differential mixer 701. The output of the first differential mixer 706 is mixed with the random pulse sequence 1301, which has been delayed by the delay 1304 to account for the XOR gate 1303 and the first differential mixer 701, at the second differential mixer 703 to create an output waveform 707 that can be passed through an inverting amplifier 704 and then coupled to an antenna 705. By mixing the noisy pulse stream 1301 with the data 1302 and mixing the output of the first differential mixer 701 with the same noisy pulse stream 1301, the spectral spikes produced by the first differential mixer 701 will be whitened at the second differential mixer 703. As would be understood by one of ordinary skill in the digital signal processing art in light of the present description, various other embodiments of the two-stage mixing approach may be used to achieve similar advantageous results.

Figure 14:
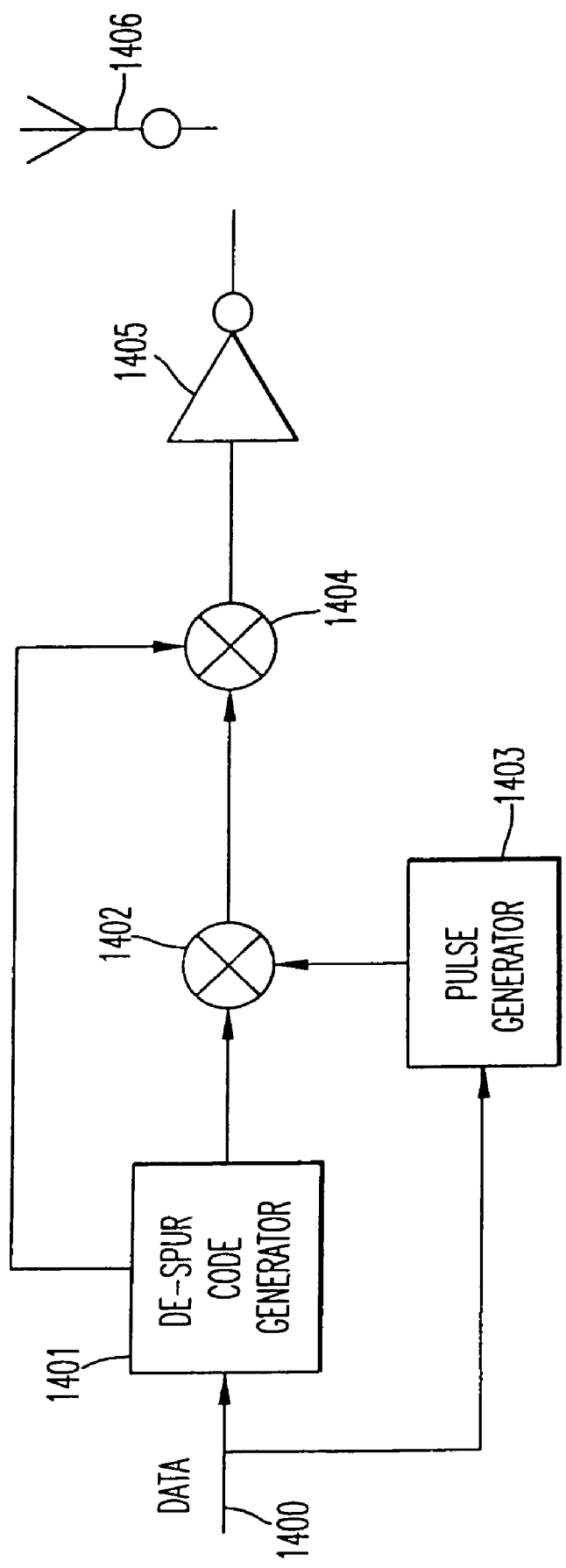
FIG. 14 is a schematic diagram of a generalized two-stage mixing circuit for achieving noise cancellation in an ultra wideband transmitter according to the present invention.

FIG. 14 is a schematic diagram of a generalized two-stage mixing circuit for achieving noise cancellation in an ultra wideband transmitter according to the present invention. As shown in FIG. 14, the transmitter includes a NRZ data source 1400, a de-spur code generator 1401, a first mixer 1402, a pulse generator 1403, a second mixer 1404, an amplifier 1405, and an antenna 1406. As discussed above, the present invention uses a two-stage mixing to cancel self-noise caused by the non-ideal analog mixers. The concepts taught herein provide advantages to UWB systems regardless of the encoding or modulation scheme being used.

By changing the circuitry of the de-spur code generator 1401 and the pulse generator 1403 many different encoding and modulation schemes may be used, such as those described in relation to FIGS. 7 and 13, as well as the various modulation techniques described in co-pending application Ser. No. 09/685,205, entitled SYSTEM AND METHOD FOR GENERATING ULTRA WIDEBAND PULSES, now issued as U.S. Pat. No. 7,010,056. For example, the transmitted UWB wavelets coupled to the antenna 1406 may, for example, be bi-phase wavelets, multi-level bi-phase wavelets, quad-phase wavelets, multi-level quad-phase wavelets, or other shapes used to encode the NRZ data source 1400. As is taught in the above-referenced co-pending application Ser. No. 09/685,205, entitled SYSTEM AND METHOD FOR GENERATING ULTRA WIDEBAND PULSES, now issued as U.S. Pat. No. 7,010,056, amplitude and phase information may be applied by the de-spur code generator 1401, the pulse generator 1403, or a combination of both.

The de-spur code generator 1401 is configured such that when the two outputs are mixed together, the resultant waveform is an encoded representation of the NRZ data source 1400. An example of this was illustrated in the embodiment presented in FIG. 7 wherein two derived codewords were produced that when recombined at the second mixer 703 results in a sequence of shaped UWB wavelets having the data stream encoded therein. As would be understood by one of ordinary skill in the art in light of the present discussion and the teachings of the above-referenced co-pending application Ser. No. 09/685,205, entitled SYSTEM AND METHOD FOR GENERATING ULTRA WIDEBAND PULSES, now issued as U.S. Pat. No. 7,010,056, the de-spur code generator 1401 in combination with the pulse generator 1403 could implement a variety of schemes for achieving the advantageous results described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of encoding an ultra wideband signal, comprising:
    receiving a data stream;
    generating a first encoder signal and a second encoder signal such that if the first and second encoder signals were mixed, the mixing would return a representation of the data stream;
    generating a sequence of pulses;
    mixing the first encoder signal with at least a portion of the sequence of pulses, to produce a mixing result; and
    mixing the second encoder signal with the mixing result, to produce a sequence of ultra wideband wavelets encoded in accordance with the data stream.

2. The method of claim 1, further comprising:
    receiving a whitening sequence from a noise source,
    wherein the generating of the first encoder signal and the second encoder signal first encoder signal is generated by multiplying the data stream by the whitening sequence, and
    wherein the second encoder signal is the whitening sequence.

3. The method of claim 1, wherein the method operates to suppresses self-noise.

4. The method of claim 1,
    wherein the data stream is received at a chipping rate, and
    wherein the operation of generating a first encoding encoder further comprises splitting the data stream into a first derivative encoded stream at half the chipping rate as a first signal output and a second derivative encoded stream at half the chipping rate as a second signal output.

5. The method of claim 4, wherein the second derivative encoded stream is 90° out of phase relative to the first derivative encoded stream.

6. The method of claim 1, wherein the generating of the first encoder signal and the second encoder signal is performed using a de-spur code generator.

7. The method of claim 1, wherein at least one of the mixing of the first encoder signal and the mixing of the second encoder signal is a differential mixing operation.

8. The method of claim 1,
wherein the sequence of pulses comprises a first pulse stream, and a second pulse stream delayed with respect to the first pulse stream by a period corresponding to width of a pulse of the first pulse stream, and wherein the mixing of the first encoder signal with at least a portion of the sequence of pulses is performed using a differential mixer having a differential input for receiving the first and second pulse streams from a pulse generator.

9. The method of claim 1, wherein the data stream comprises high rate non-return-to-zero data.

* * * * *